T. P. PAYNE.
METAL WORKING MACHINE.
APPLICATION FILED OCT. 22, 1909.
1,075,492.
Patented Oct. 14, 1913.
12 SHEETS—SHEET 4.
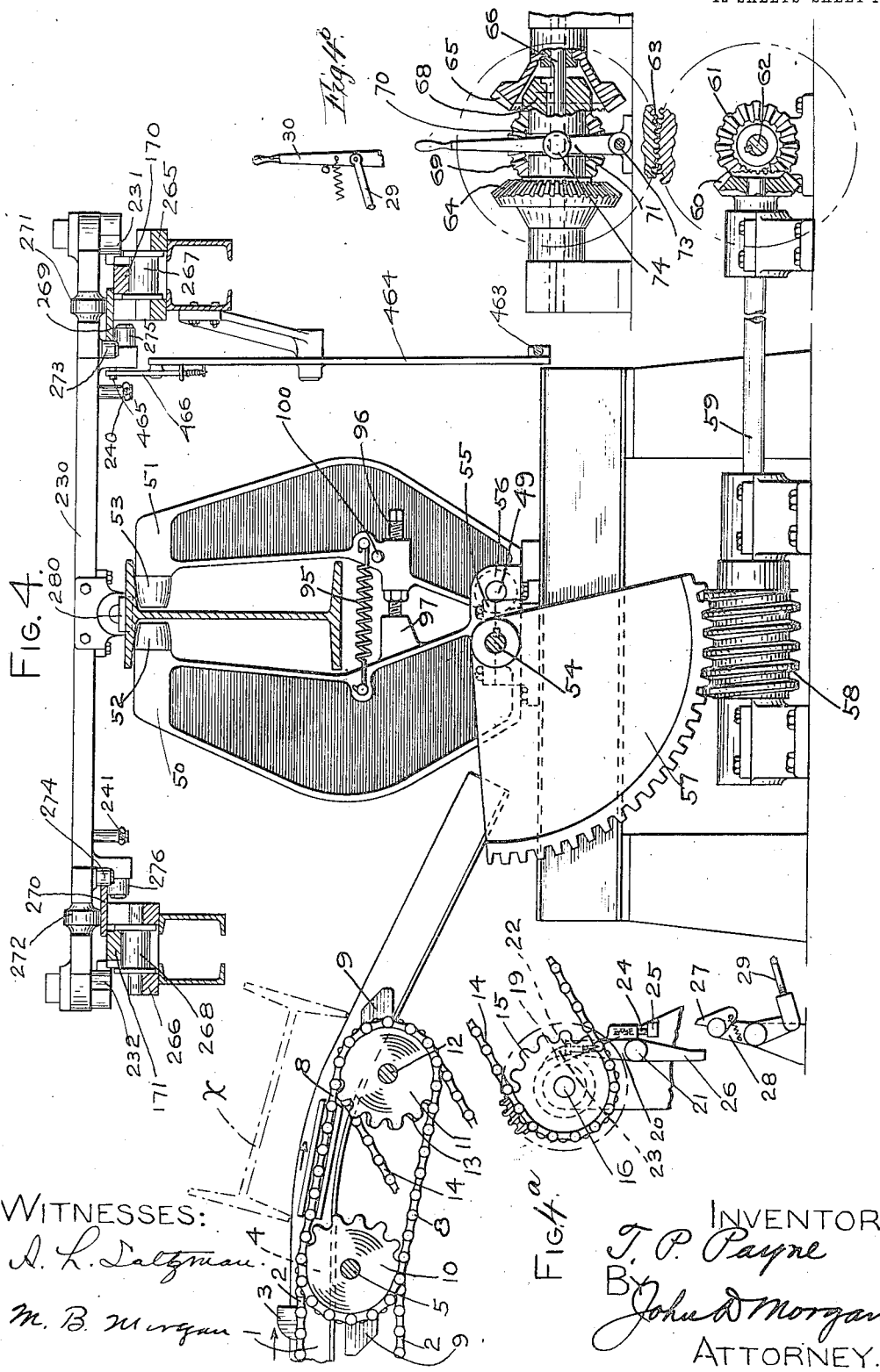
WITNESSES:
A. L. Saltzman
M. B. Morgan
INVENTOR:
T. P. Payne
By John D. Morgan
ATTORNEY.

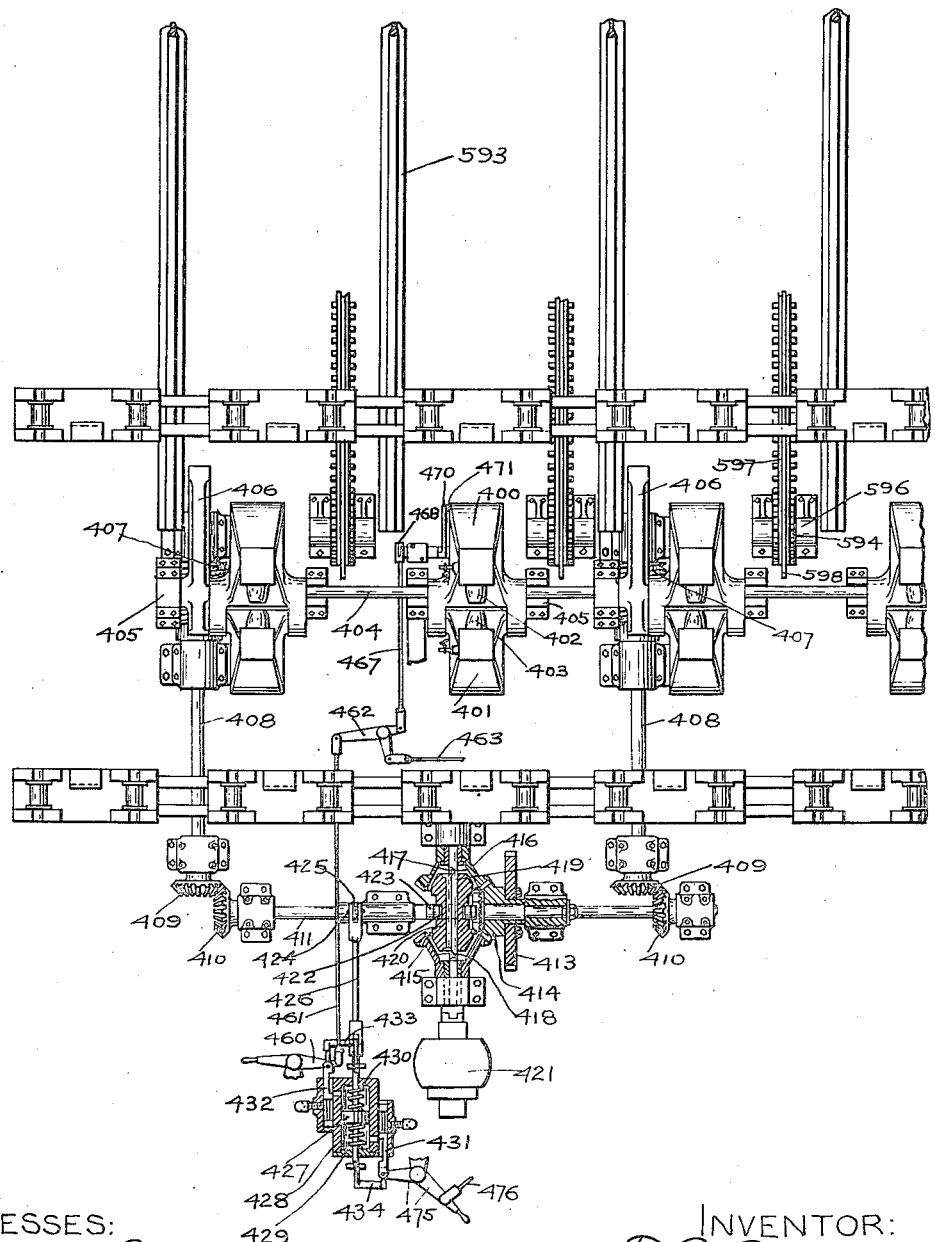

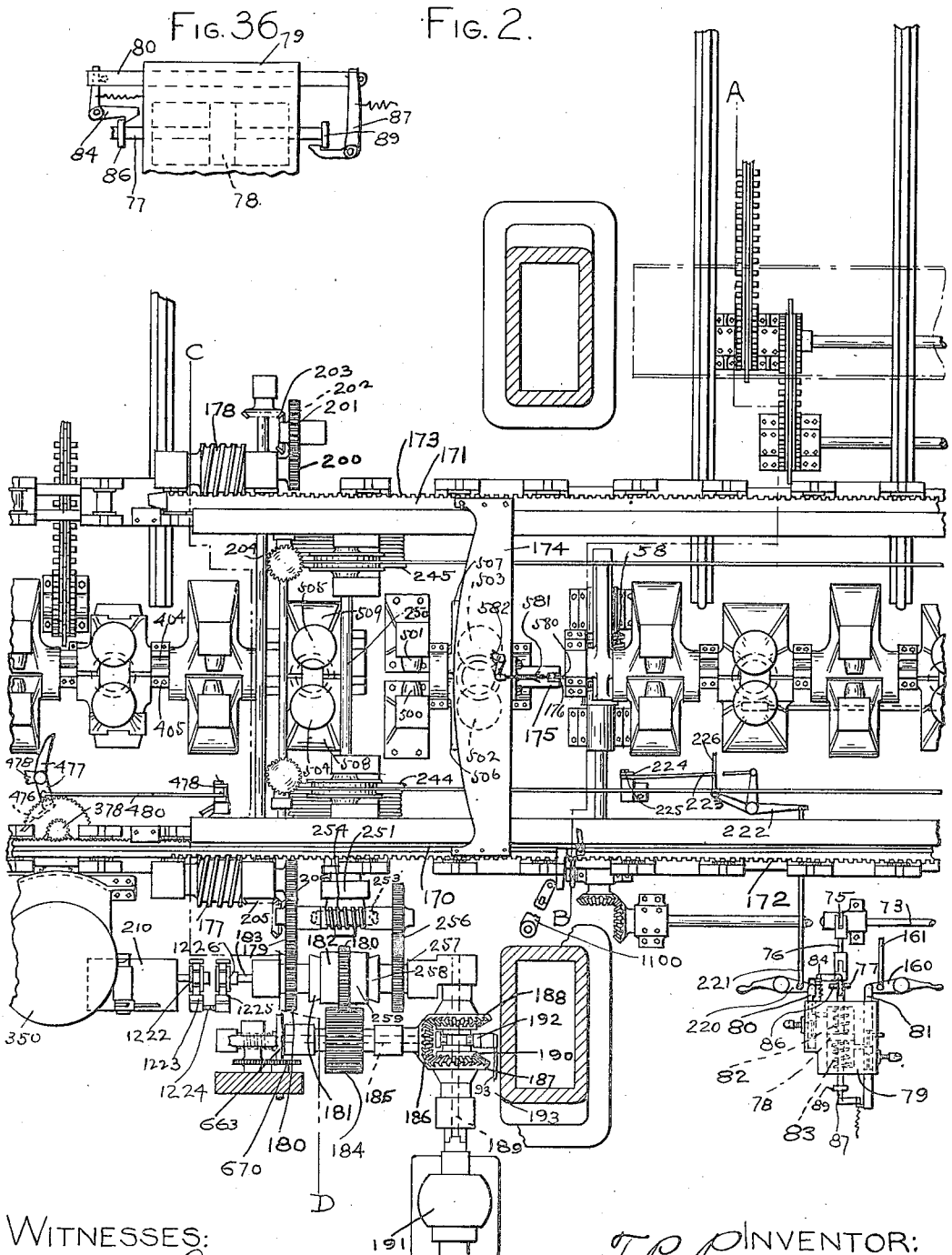

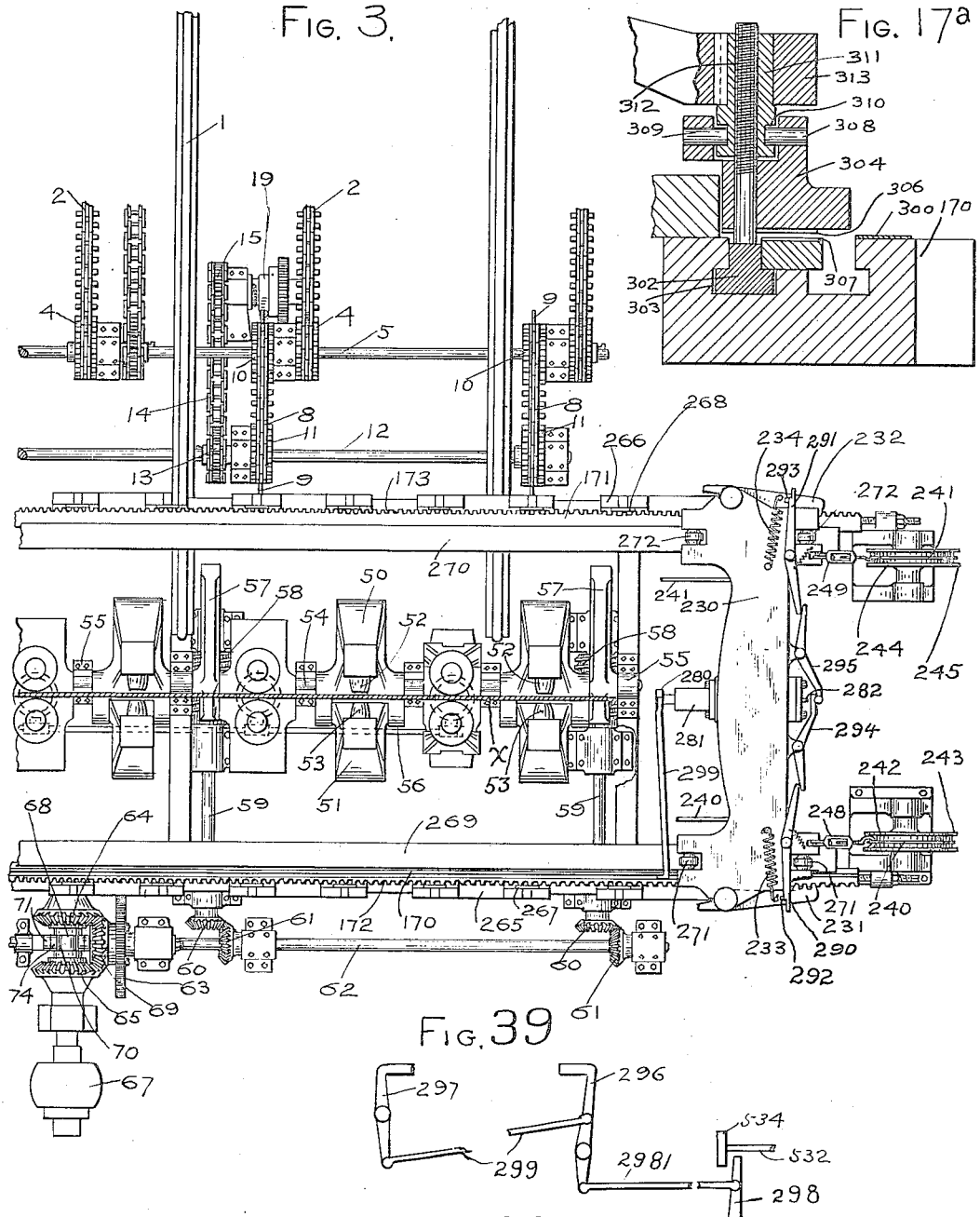
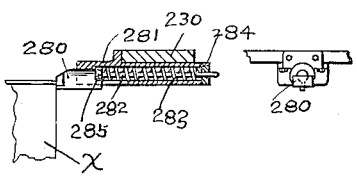

T. P. PAYNE.
METAL WORKING MACHINE.
APPLICATION FILED OCT. 22, 1909.
1,075,492.
Patented Oct. 14, 1913.
12 SHEETS—SHEET 5.
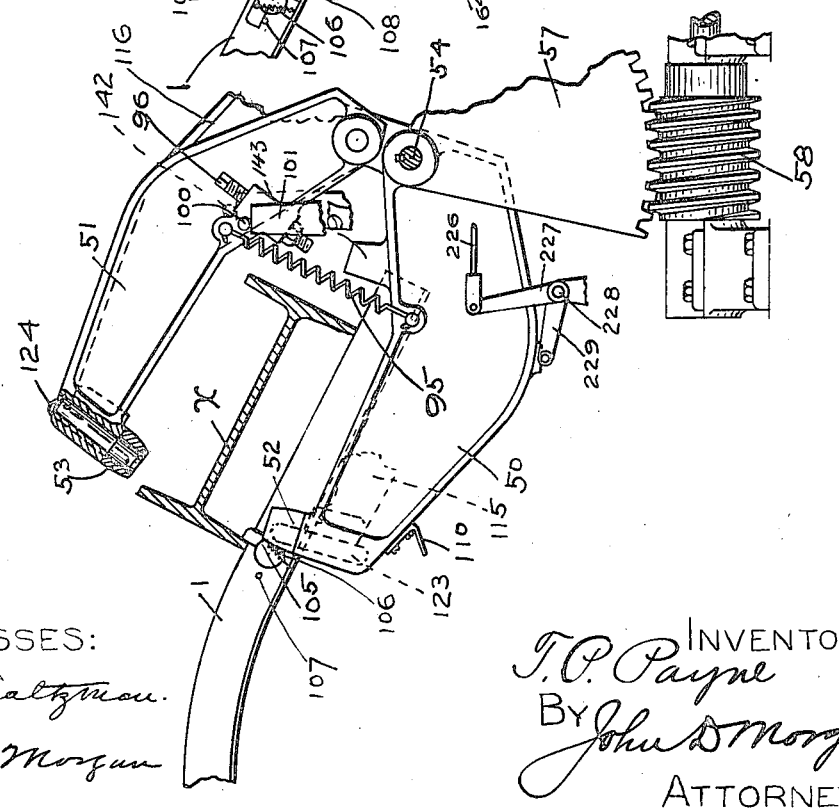
WITNESSES:
A. L. Saltzman.
M. B. Morgan.
INVENTOR:
T. P. Payne
By John D. Morgan
ATTORNEY.

T. P. PAYNE.
METAL WORKING MACHINE.
APPLICATION FILED OCT. 22, 1909.
1,075,492.
Patented Oct. 14, 1913.
12 SHEETS—SHEET 6.
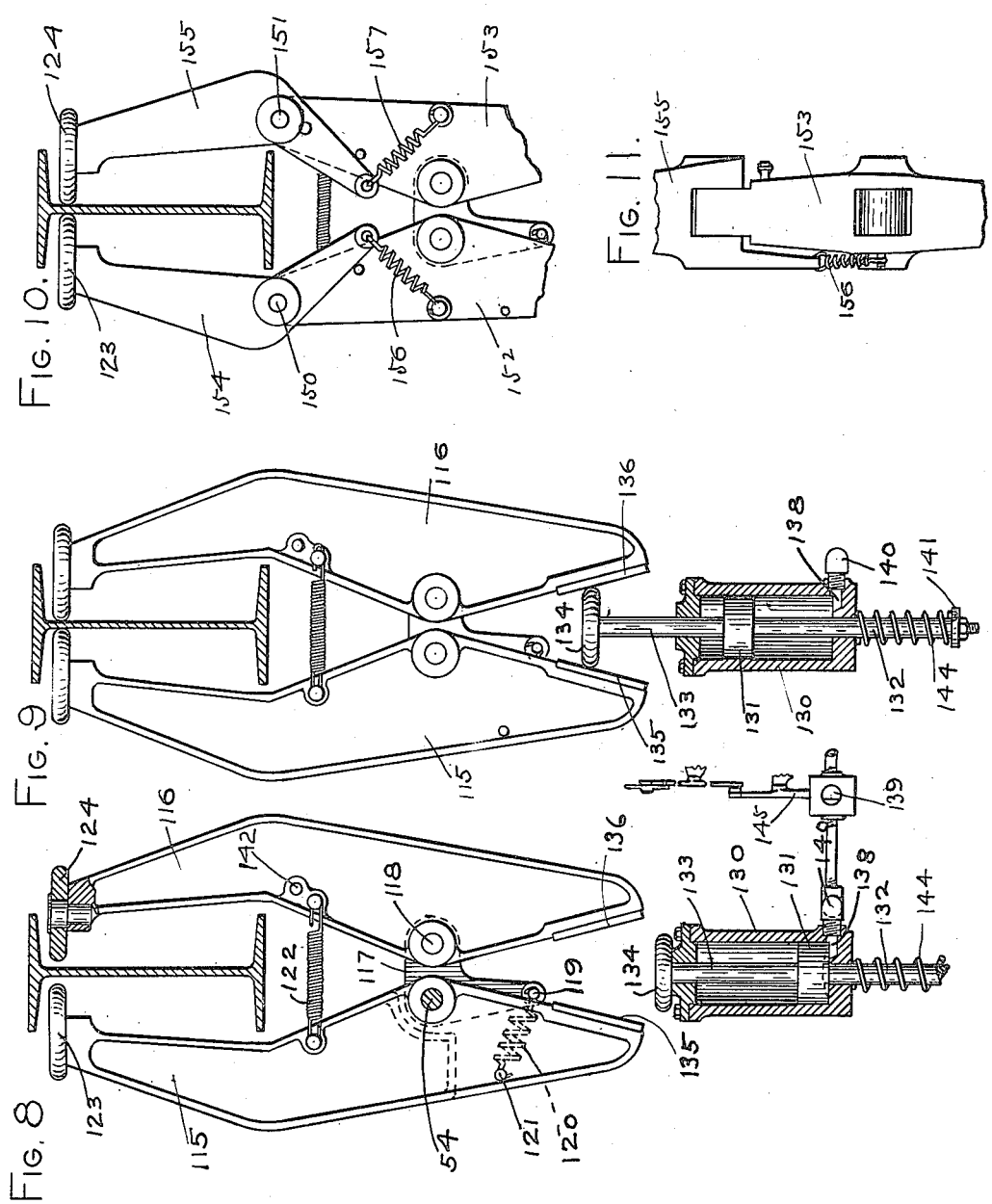
WITNESSES:
A. L. Saltzman.
M. B. Morgan.
INVENTOR:
T. P. Payne
BY
John D. Morgan
ATTORNEY.

T. P. PAYNE.
METAL WORKING MACHINE.
APPLICATION FILED OCT. 22, 1909.
1,075,492.
Patented Oct. 14, 1913.
12 SHEETS—SHEET 7.
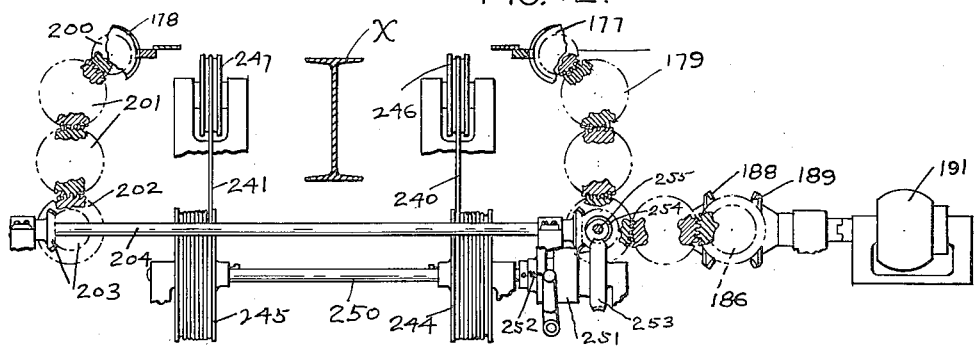
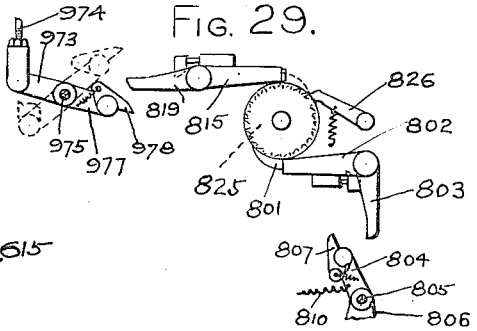
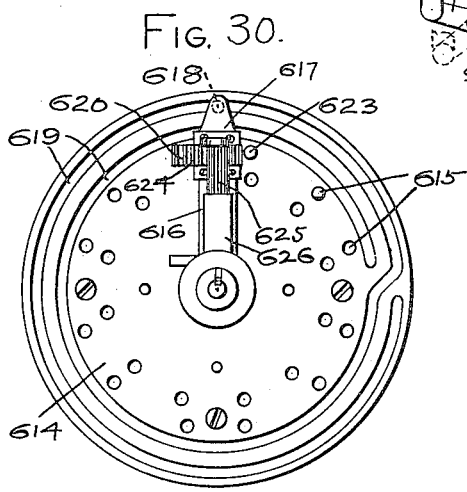
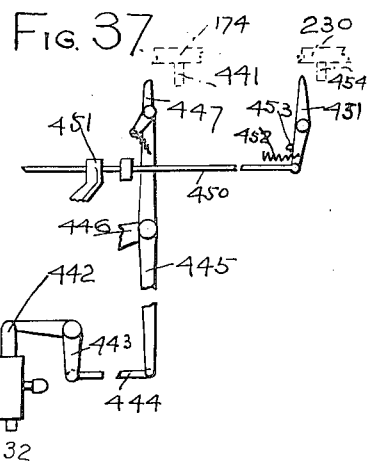
WITNESSES:
Augusta L. Saltzman.
M. B. Morgan
INVENTOR:
T. P. Payne
By John D Morgan
ATTORNEY

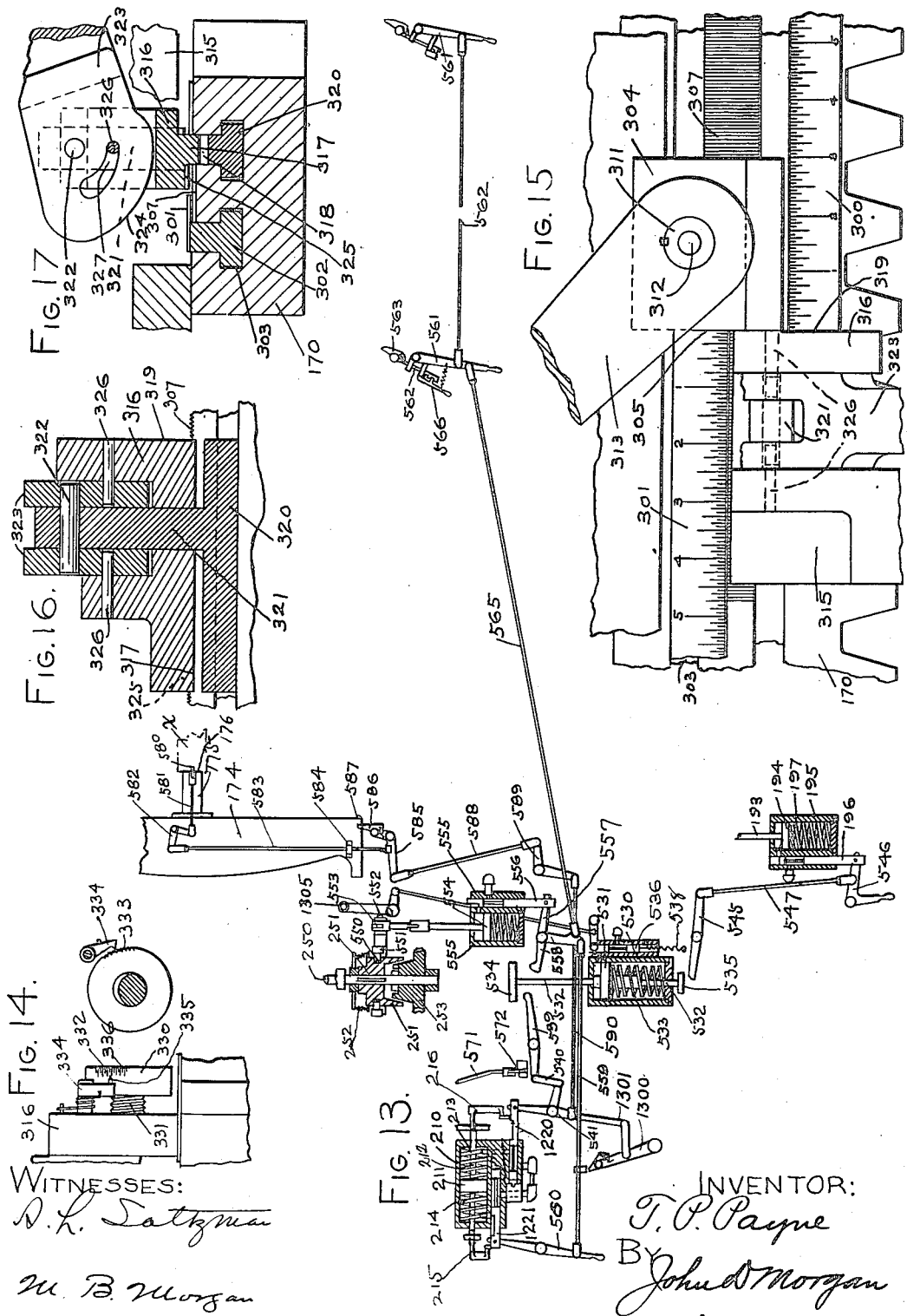

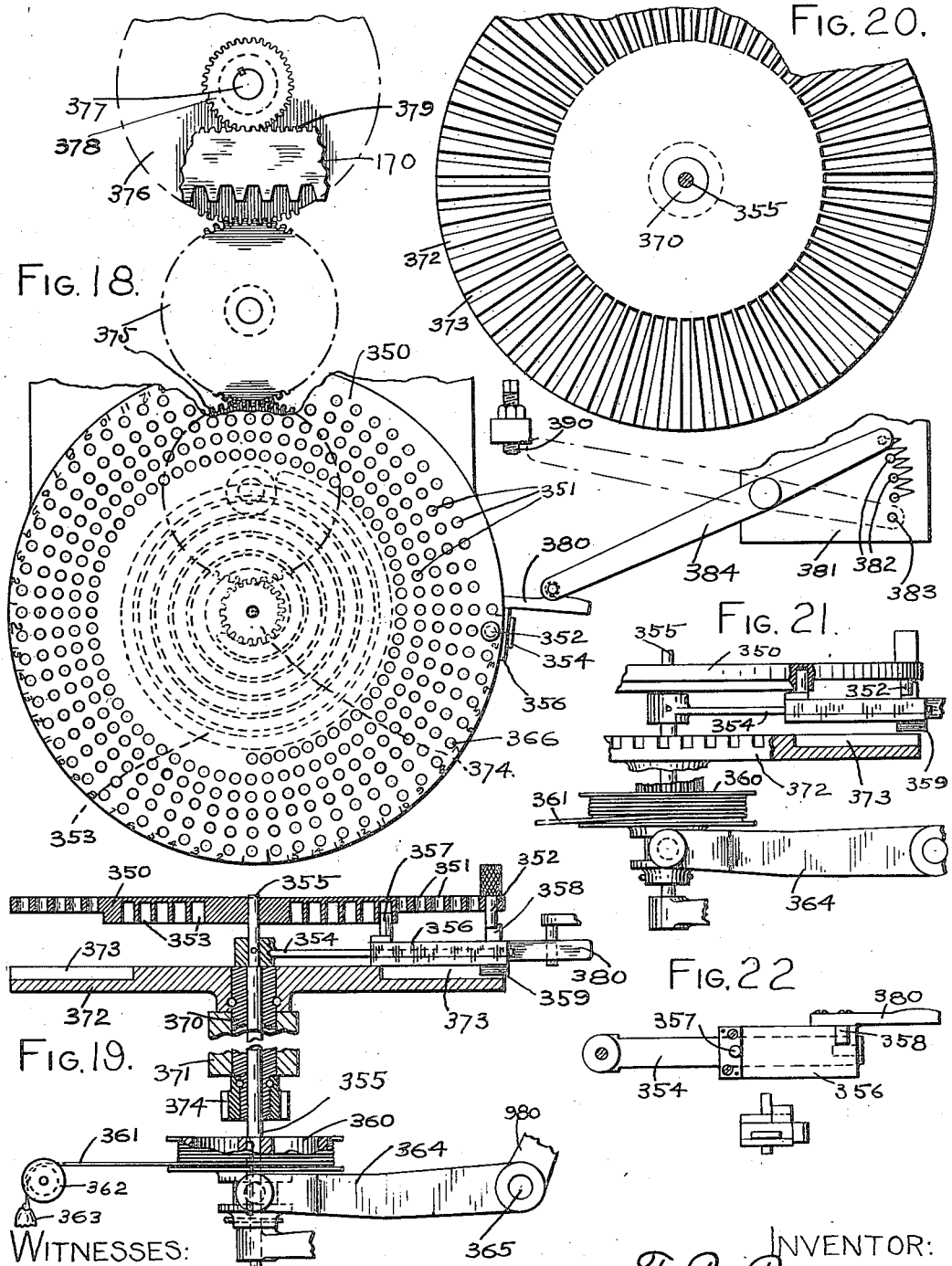

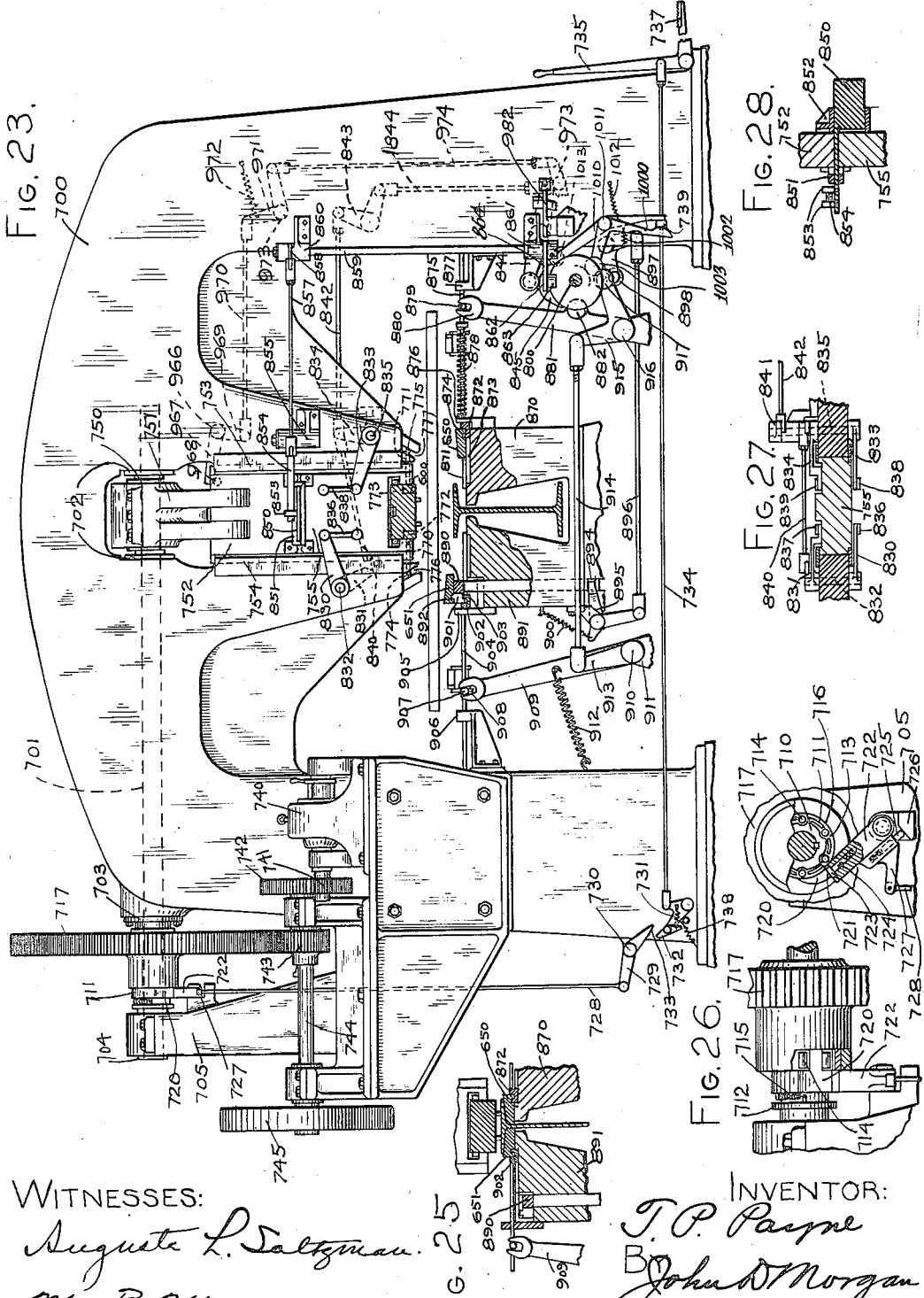

T. P. PAYNE.
METAL WORKING MACHINE.
APPLICATION FILED OCT. 22, 1909.
1,075,492.
Patented Oct. 14, 1913.
12 SHEETS—SHEET 11.
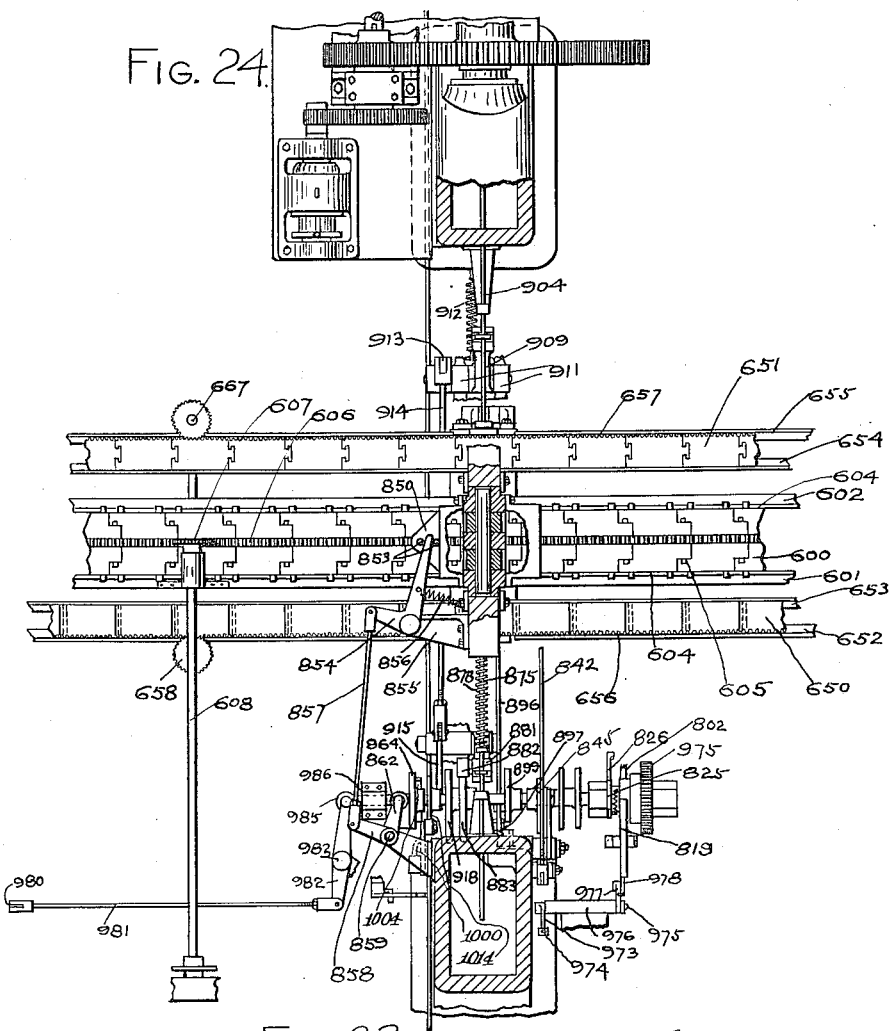
WITNESSES:
INVENTOR:
T. P. Payne
BY John D Morgan
ATTORNEY.

T. P. PAYNE.
METAL WORKING MACHINE.
APPLICATION FILED OCT. 22, 1909.
1,075,492.
Patented Oct. 14, 1913.
12 SHEETS—SHEET 12.
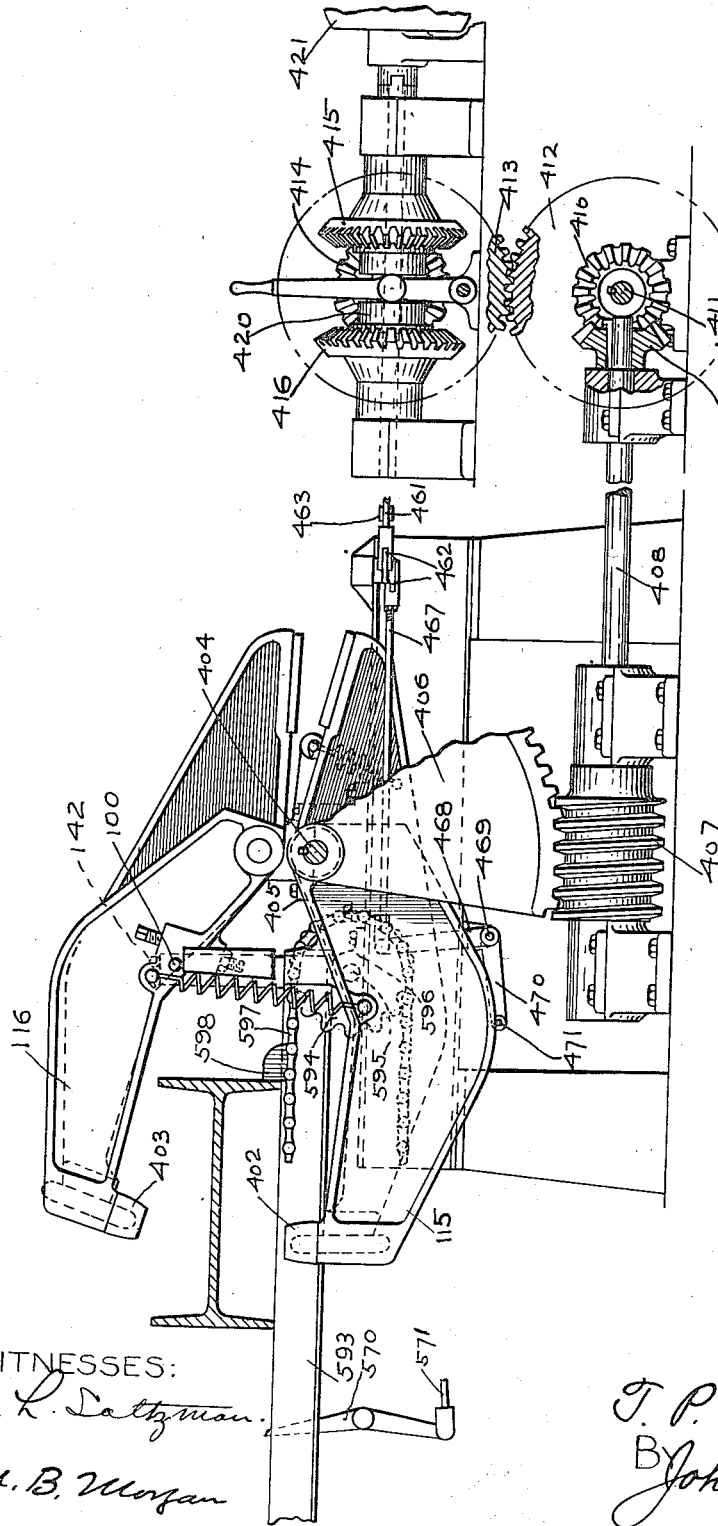
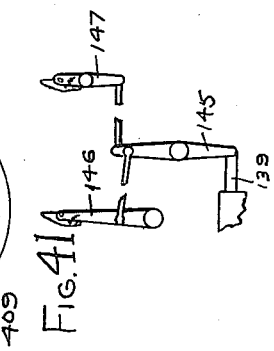
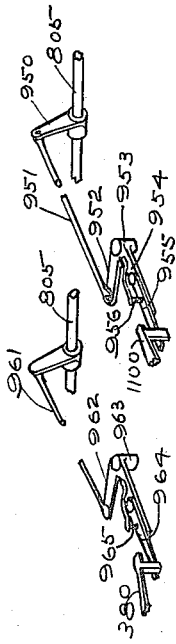
WITNESSES:
A. L. Saltzman.
M. B. Morgan
INVENTOR:
T. P. Payne
By John D. Morgan
ATTORNEY.

UNITED STATES PATENT OFFICE.

THEODORE P. PAYNE, OF NEWARK, NEW JERSEY.

METAL-WORKING MACHINE.

1,075,492.  Specification of Letters Patent.  Patented Oct. 14, 1913.

Application filed October 22, 1909. Serial No. 523,974.

*To all whom it may concern:*

Be it known that I, THEODORE P. PAYNE, a citizen of the United States, residing at Newark, in the county of Essex and State of New Jersey, have invented new and useful Improvements in Metal-Working Machines, of which the following is a specification.

The invention relates to machines for the fabrication of metal shapes, and more particularly to machines for placing and piercing holes in beams, plates and other structural shapes, although in certain of its aspects the invention may be useful in other connections.

Objects of the invention are to provide a machine for rapidly performing operations in predetermined positions by tool equipped means upon work progressed through the machine; to provide a machine for rapidly placing successive holes, or groups of holes, in a structural shape, or other work, without a preliminary laying out; to provide for mechanical or automatic handling of the work in positioning it relative to the means for operating thereon; to provide control of the devices for moving the work whereby they are absolutely, and if desired, automatically controlled; to position the work so that successive holes or groups of holes, or other operations, will be in proper relation to each other and to the work without the usual laying out upon the material itself; to provide for mechanical or automatic centering and adjusting of the work upon the machine and relatively to the piercing devices or other tool equipped means; to provide for automatic supply of work to the machine up to its capacity; to provide for a mechanical and automatic removal of the work from the machine as soon as the operations thereon are completed; to provide for successively repeating the placing of holes automatically by the machine; to provide for automatic control of one group of mechanism by another to bring them into proper sequential operative relation with the work; to provide a machine requiring a minimum of labor and of attendance for the work done and with a minimum of preparatory work; to prevent other than a proper sequential operation of the machine by an operative; to provide for making in rapid succession groups of holes varying in number and in position with respect to each other; to provide mechanism for easily and rapidly utilizing different piercing devices successively on the work; to provide for making the piercing of a shape and purely mechanical operation succeeding immediately on the other steps in its manufacture.

Other objects of invention will in part be obvious and will in part more fully appear herein.

The invention consists in the novel parts, mechanisms, combinations and improvements herein shown and described.

The accompanying drawings, referred to herein and forming a part hereof, illustrate an embodiment of the invention, the same serving in connection with the description herein to explain the principles of the invention.

Of the drawings: Figures 1 to 3 inclusive, are a single plan of a machine constructed in accordance with the principles of the invention, the figures running from left to right; Fig. 4 is a transverse section on the line A—B of Fig. 2 looking toward the right with certain parts omitted for the sake of clearness; Fig. 4ª shows the other end of chain 14 and the associated parts; Fig. 4ᵇ is a fragmentary detail of the manual control for the retaining arm 26; Figs. 5 and 6 are fragmentary elevations showing the operation of the arms which present the work to the progressing means; Fig. 7 is a fragmentary detail illustrating the action of the dog 105 during the feeding of the work; Figs. 8 to 11 inclusive are views of the alining means; Fig. 12 is a fragmentary sectional view substantially on the line C—D illustrating especially the drive for the progressing means; Fig. 13 is a plan, with parts in section, showing certain controls for the progressing means; Fig. 14 is a detail view showing the compensating devices for positioning the work on the progressing means; Figs. 15, 16, 17 and 17ª are fragmentary views of one form of distance determining devices; Fig. 18 is a detail view of another form of distance determining devices; Fig. 19 is a sectional view taken substantially on the central line of Fig. 18; Fig. 20 is a detail of the member 372 which serves to connect the progressing means with distance determining means; Fig. 21 is a fragmentary view corresponding substantially to a portion of Fig. 19 showing the parts in a different position; Fig. 22 is a detail of parts shown in Fig. 19; Fig. 23 is an elevation showing particularly the tool equipped means with its housing and operating means and their relation to the progressing means; Fig. 24 is a fragmentary plan showing particularly the tool equipped means and its relation to its actuating means, portions of the housing being broken away for clearness; Figs. 25 to 29ª inclusive, are fragmentary views showing details of the tool equipped means and their associated parts; Figs. 30 to 34 inclusive, are details of the controlling means for the trains of punch and die blocks; Fig. 35 is a vertical section substantially on the line E—F of Fig. 1, with certain parts removed, showing the operation of the work discharging devices; Fig. 36 is a fragmentary view of certain mechanism connected to the fluid pressure cylinders; Fig. 37 is a detail of one of the valve controlling mechanisms; Fig. 38 is a detail of the work contacting head of bridge 230; and Figs. 39 to 41 are details of various controlling mechanisms.

Referring to the accompanying drawings, which illustrate by way of example one embodiment of the invention, means are provided for supplying the work in the form of structural shapes, or other material to be operated upon, to the machine. The form of such means shown comprises devices for successively supplying shapes to suitable progressing means which in turn presents the work in proper position to be operated upon by the tool-equipped means and progresses the work so that said means may act upon various parts thereof as selected. The supplying means in accordance with one feature of the invention includes devices for receiving the work as applied thereto more or less at the convenience of the operatives or of a mechanical source of supply and of delivering it to the progressing means, either directly or indirectly, whenever said means is ready to receive it. The form of supplying means shown herein (see especially Figs. 3 to 6) comprises rails 1 and sprocket chains 2, which may be continuously driven by any suitable means, and which are provided with engaging lugs 3, said chains passing over suitable sprocket wheels 4 which may be loosely mounted on the shaft 5. The work may be slid along the rails as it is progressed by means of the lugs 3 engaging it.

The illustrated form of supplying means further comprises a conveyer for receiving the work from the devices just described and supplying them in the present instance not directly to the progressing means but to transferring and positioning means, which in turn presents said work to the progressing means whenever the progressing means is ready to receive it, and may, if desired, also be called into action by the progressing means coming or being in receiving position. The illustrated form thereof (see Figs. 3 to 7) comprises a series of sprocket chains 8, provided with engaging devices, or lugs 9, said chains passing over sprocket wheels 10, which may be conveniently carried loose on the shaft 5. Said sprocket chains 8 are also shown passing over sprocket wheels 11, which may be fixed on a shaft 12. A suitable drive is provided for said conveyer, and as shown herein comprises a sprocket wheel 13, likewise fixed to shaft 12, said sprocket wheel carrying the sprocket chains 14. The sprocket chains 14 are carried by a sprocket wheel 15 fixed on a shaft 16.

Suitable means are provided for operating the supplying means in harmony with the movements and positions of the progressing means, and also to provide for the control or government of the operations of said supplying means by the progressing means, or by the operator, as desired. In the illustrated form of such means a driven gear 18 is connected through a suitable clutch 19 to the shaft 16 carrying said sprocket wheel 15. Pivotally mounted on a suitable support at 21 is shown an arm 20 having in its end a spring pressed pin 22 in coöperative relation with a lug or tooth 23 on clutch 19. A spring pressed pin 24 is shown mounted on said arm 20, and resting on a lug 25. This serves to hold arm 20 in position to prevent rotation of shaft 16, and also to cause the return of arm 20 to engaging position upon the escapement of said shaft. Depending from arm 20 is a member 26 having a face in position to be engaged by a spring pressed dog 27, carried on a pivotally mounted arm 28. Said parts may be proportioned and arranged so that a single release of the clutch will cause a single rotation of shaft 16 which in turn may serve to carry the lugs 9 a sufficient distance to deliver a piece of work to the progressing means. The form of construction shown permits, through the yielding of dog 27, and the impulsion of pin 24, the quick return of arm 20 to prevent more than a single rotation of shaft 16, and also allows the later return or idle movement of arm 28. It will be obvious that should there be hesitation or delay in clutching, pin 22 by reason of its spring projecting it outwardly as soon as it is moved out of engagement with the tooth or lug 23, will prevent the return of arm 20 until the passage of engaging lug 23.

Suitable means for causing the arm 28 to actuate the retaining arm 26 are provided, and as shown herein comprise a link 29 pivoted to arm 28 and which may be controlled by the hand of the operator, if desired, as for instance by a lever 30.

The progression of the work from the conveyer to the receiving or transferring means may be aided by gravity, if desired, and such a form is shown herein, the ends of the rails 1 being inclined for this purpose.

In accordance with certain features of the invention means are provided for transferring the work from the conveyer to the work progressing means, although so far as concerns other features of the invention the conveyer may deliver direct to the work progressing means. Certain aspects of the invention provide means for supporting the work by rolling contact therewith while it is being progressed, which will be found especially advantageous both where the work is heavy or large or both. In the present embodiment certain of the devices used to support the work when it is in operative relation with the progressing means, to be progressed and positioned relatively to the tool equipped means, are also used to transfer said work from the conveyer to said work progressing means. In the form of such means comprised in the present embodiment there are shown members 50 and 51 relatively movable to receive the work and also to engage and support it. Said members are also given a common movement for transferring the work from the conveyer to the work supplying means to the work progressing means. Each pair of the members 50 and 51 are shown pivotally connected together by suitable means, as by lugs 56 on the members or arms 50 in which lugs rods 49 on the members or arms 51 are journaled. This serves to permit each pair of arms 50 and 51 to swing toward and from each other. At their other ends the arms may be provided with rollers 52 and 53 which engage and support the work by rolling contact therewith. The pair of arms may thus move apart to receive the work and close together to engage and support it, as is shown in connection with the I beam in Figs. 4 to 6.

For the purpose of transferring the work from the supplying to the progressing means in the present embodiment the arms 50 and 51 are shown movable together into operative relation successively with the conveyer and the progressing means. It will be understood certain pairs of arms 50 and 51 need not be mounted for such movement together, if desired, and this may be the case with certain pairs thereof located near the central part of the machine and which do not take part in receiving or discharging the work, but do support and direct the work as it is progressed and presented to the tool equipped means to be operated upon thereby. This common movement of the pairs of arms in this embodiment is rotatory and the form of means for effecting it shown herein comprises a shaft 54 upon which the arms 50 are fixed. Fixed to the shaft 54 are shown gear sectors 57. In operative relation to sectors 57 are worms 58 fast to shaft 59, said shaft carrying miter gears 60. Meshing with gears 60 are gears 61 carried fixed on a shaft 62 which may be driven by means of gears 63. Bevel gears 64 and 65 are shown mounted to freely rotate about shaft 66, which is in turn coupled to a suitable source of power such as a motor 67. Said gears are provided with surfaces arranged to be operatively connected with a clutching member 68 slidable on but rotatable with said shaft 66. Fixed with relation to the said shaft 66 is a beveled pinion 69 meshing with gear 63 is a beveled pinion 69 meshing with gears 64 and 65. It will be understood that, with a certain direction of rotation of the power provided, the driving contact of clutch member 68 with gear 65, for instance, will through the hereinbefore described mechanism give a certain rotation to worm 58 and, for example, move members 50 and 51 to the work receiving position. By reversing the member 68 to operatively connect gear 64 with the source of power, the opposite direction will be given to worm 58, and the members 50 and 51 will be moved to the position where the work is in operative relation to the progressing means. Fig. 5 illustrates the former position of the arms 50 and 51, and Fig. 6 illustrates the latter. The neutral or intermediate position of clutch members 68 may be arranged so that it is out of contact with both the gears 64 and 65, thus permitting the arms 50 and 51 to remain in any desired position.

Suitable means for actuating and holding the clutch member 68 in the neutral and in each of the other positions are provided, and are shown herein as comprising an annular recess 70 (see Fig. 3) in said member 68 having in operative relation therewith a yoke 71 fast to shaft 73, and provided with rolls 74, engaging said recess. Fixed to shaft 73 is an arm 75 (see Fig. 2) having pivotally attached thereon a rod 76, the other end of which is suitably connected to a piston rod 77, carrying piston 78, working in cylinder 79. A fluid under pressure may be provided for the actuation of the mechanisms just described, and means for controlling said fluid under pressure are shown in the form of valves 80 and 81, arranged to admit said fluid to and exhaust it from the respective ends of the cylinder. Means may also be provided for returning the piston and coöperative clutch member to intermediate or normal position, and in the embodiment illustrated are shown in the form of springs 82 and 83, arranged conveniently coiled about a piston rod 77, and in position to act against the respective faces of the piston 78 and the opposed ends of the cylinders 79. If desired these springs may be in a balanced or relaxed condition when the piston is in the normal or intermediate position. Means are provided for positively retaining in position said clutch member 68 when disengaged from the gears 64 and 65 (see Fig. 36), such means being shown in the form of a pivoted, spring-pressed latch 84, suitably mounted in position to engage a collar 86 fast on the piston rod 77. Said latch is in operative relation to a valve rod 80, so that a movement of the latter tends to raise the said latch 84 out of the path of the collar 86. There is similarly arranged a pivoted spring-pressed latch 87 suitably positioned to engage a collar 89 which is fixed on said rod 77. The latch 87 is conveniently placed adjacent to the valve rod 81 so that a motion of said rod 81 will tend to raise the latch 87 out of the path of the collar 89. The operation of this valve and clutch mechanism is substantially as follows: A movement of valve 80 will cause the fluid under pressure to be admitted to the rear end of cylinder 79, as shown in Fig. 2, thus causing piston 77 to move in the direction of the front of the machine. The latch 84 is lifted by the movement of the valve rod 80 permitting the collar 86 to pass thereunder. The spring 83 will be placed under tension between piston 78 and the cylinder head adjacent, by the fluid under pressure. The movement of piston 78 serves to rock shaft 73, thereby connecting the adjacent face of clutch member 68 with the gear 65. Upon reversing valve 80 the fluid under pressure is released, and the piston, acting under the impulse of the spring 83, will be returned to an approximate mid-position, the latch 84 is permitted to be placed, under impulse of its spring, in position to engage collar 86, and with the coöperation of latch 87, which engages collar 89, arrest piston 77 in its intermediate position. Thus the clutch member 68 is thrown out of engagement with gear 65 and is held in this position. The operation of the mechanism for clutching member 68 with gear 64, and the release thereof, by means of valve 81, is substantially the same and need not be described in detail.

Suitable means are provided for governing the relation of the members 50 and 51 to each other in the work engaging and supporting position, and for varying that relation to accommodate, or coöperate with work of different kinds. Said means are also designed while accomplishing the foregoing to also permit the opening or work receiving movement of the arms. The form of such means illustrated comprises spring devices acting on said arms and devices acting against said springs and movable to control the approach of the arms to each other. A spring 95 is shown in tension between an arm 50 and its companion arm 51. A screw 96 is shown threaded into the arm 51 and bearing on a face 97 on the arm 50. Means are likewise shown for positioning said arms to receive the work, and in the form thereof shown a pin 100 on arm 57 engages with a stop 101 on the machine frame as shown in Fig. 5 of the drawings.

Means are provided in accordance with one aspect of the invention for insuring that the work will not be delivered to the arms 50 and 51 until they are in position to receive it. The form of such means shown herein comprises one or more pivoted dogs 105 suitably mounted with respect to said members 50 and 51 and adjacent to the rails 1, and carrying a spring 106 arranged so as to hold said dog in either of two positions. Conveniently placed to stop said dog in one position is pin 107 and 108 to stop it in another position. Pin 109 on said dog 105 is suitably located to coöperate with a projection 110 carried on the member 50. The position of the dog 105, during the approach of arm 50 to the receiving position may be such that the projection 110 idly assumes a position adapted to trip said dog 105 as the work is carried on said arms to the progressing position. It being understood that the work in its passage upon rails 1 has caused the dog 105 to be thrown so that said dog is placed in the proper position to be returned by projection 110 as described. It will be understood that in certain aspects of the invention and with certain kinds of work, the dog or any equivalent may be dispensed with and likewise in certain aspects of the invention and with certain kinds of work, the intermittent conveyers 8 may be dispensed with, or both may be used together as shown in the present embodiment.

Means for transversely positioning, or centering, the work with respect to the tool-equipped means are provided by the invention. The form of such means shown herein comprises a series of pivoted arms 115 and 116 arranged to engage the work on either side thereof. A series of blocks 117 are fixed to shaft 54 and a lug on said block carries a rod or pintle 118 on which the arm 116 is pivotally mounted. The corresponding arm 115 is shown mounted loosely on shaft 54 to turn thereon. A spring 120 is shown acting between the arm 115 and block 117 and connected to a pin 119 in the block and a pin 121 on the arm 115. The form of devices for engaging the work to aline it comprises rollers 123 and 124 shown carried on the arms 115 and 116. A spring 122 is shown herein for holding arms 115 and 116 in an approximately normal relation. It may be convenient to maintain the rollers 123 and 124 more or less separated from each other and for this reason spring 122 is shown fully compressed or relaxed, but having its ends connected to the arms by the loop and pin to permit the lessening of the space between said rollers 123 and 124 without buckling the spring.

Suitable means for governing the alining action of the arms 115 and 116 are provided. In accordance with one feature of the invention fluid pressure means are provided for this purpose, and the illustrated form thereof comprises a series of cylinders 130. Within said cylinders 130 are pistons 131 having their rods 132 and 133 projecting from the opposite ends of said cylinders. The end of the rod adjacent to the projecting members 135 and 136 of the arms 115 and 116, respectively, carries disk 134 so positioned as not to interfere with the movement of the arms 115 and 116 when the shaft 54 is rocked, but movable under the action of the fluid pressure in the cylinders to pass between the members 135 and 136 to push them apart and bring the disks 123 and 124 into contact with the work to accurately aline it as shown in Figs. 8 and 9. A port 138 allows the admission and exhaust of the fluid under pressure, a valve 139 suitably placed, controls said fluid through a port and a pipe 140. An arm 145 is operatively attached to said valve 139, and connects with other mechanisms as will appear hereinafter. For returning the piston and its disk to normal position, a spring 144 may be conveniently coiled about the end 132 of the rod 133 acting between the adjacent end of the cylinder 130 and a collar 141 fixed on said rod 132. For moving the arms 115 and 116 apart to receive the work, as shown in Fig. 5 there may be provided a pin 142 on the arm 116, arranged to co-act with projection 143 to move the arms apart against their spring. In the present embodiment means are also provided for permitting certain of the positioning or alining means to accommodate inequalities or deviations from a true shape, as may sometimes be present in the work. The present embodiment shows a form of such means comprising spring controlled arms 154 and 155 carrying the rollers 123 and 124. Pivots 150 and 151, carried on arms 152 and 153, corresponding to arms 115 and 116, support members 154 and 155 respectively. One end of each of said members 154 and 155 has fixed thereto springs 156 and 157, the other ends being fast to pins on arms 152 and 153 respectively. Excepting for the ability to yield for the defects mentioned the control and action of centering is substantially similar to that previously described in connection with the arms 115 and 116.

The invention in one of its aspects provides means for controlling the action of the transferring means controlled by or dependent on the work being in, or coming to, position to be carried through the machine. In this embodiment this is made dependent on the work being fed up to the transferring means to be by it handed over to the progressing means. The form of such means shown herein comprises an arm 160 suitably mounted and arranged to be operatively connected with a valve rod 81. Said arm 160 has pivotally connected thereto one end of rod 161, the other end of which is carried by an arm of a bent lever 162 pivotally mounted at 163. On another arm of said lever 162 is suitably connected a rod 164, which is pivotally fastened to a lever 165, conveniently arranged in operative relation with the dog 105 (see Fig. 6). An arm 166 arranged in the path of one of the arms 51, engages a grooved collar 167 fast on the rod 161. It will be understood that the valve 81 when thrown in position by one of said means will remain in said position until operated on by the other of said means. For the reverse movement of the transferring means the valve rod 80 has pivotally connected to it a pivoted arm 220 which is pivoted to one end of the rod 221, which is operatively connected to an arm of the three-armed lever 222. Another arm of said lever 222 has pivoted to it a rod 223, which is operatively attached to an arm 224 carrying a spring pressed dog 225, arranged to be operated by the progressing means (in this instance the bridge 230) in one direction only. Lever 222 also connects with one end of rod 226, the other end of said rod being pivotally fastened to an arm 227 which is fast on a rock shaft 228. An arm 229 fast on said shaft 228, is suitably placed in the path of one of the arms 50 (see Fig. 5), and adapted to be engaged thereby. This valve mechanism is also arranged to remain in the position to which it is thrown by one action, until reversed by the other. Valves 80 and 81 are shown also adapted for manual operation if so desired.

It will be understood from the foregoing that the movement of the progressing means, that is bridge 230, serves to throw valve 80, thus operatively connecting clutch member 68 with the gear 65, and hence connecting the motor 67 with the worm 58. This rocks the series of arms 50 and 51 to the work receiving position. On the approach of said arms to this position, contact with arm 229 causes the reversal of valve 80 and thus disengages the said clutch member 68 and the coöperating face on gear 65 and bringing the arms to rest in the desired position. Upon the second operation of dog 105 by the work, after said work has been carried by the lugs 9 of the sprocket chains 8, the further travel of said dog actuates the lever 165, which, through the hereinbefore described connection throws valve 81 to admit the fluid under pressure for actuating the piston 78 in the desired direction. Clutch member 68 is thereby made to engage the coacting face of gear 64 thus connecting motor 67 with worm 58. The arms 50 and 51 are moved to the other extreme position, bringing the work in the operative position for actuation by the progressing means. As the said arms 50 and 51 approach this latter position, the arm 229 is contacted and valve 81 is reversed, exhausting the fluid under pressure and thus causing the disengagement of clutch member 68 and the gear 64, bringing the arms 50 and 51 to rest in the desired position.

The form of progressing means illustrated herein comprises devices for firmly engaging the work, progressing it with relation to the tool-equipped means and also for co-operating with the alining devices to maintain the desired position with reference to the tool-equipped means. The present form of progressing means includes a member fixed with respect to the actuating or driving means, and being operatively connected to suitable distance determining means for accurately and positively placing the work within range of the tool-equipped means for operation thereon, and in accordance with a pre-determined setting. Also a member relatively movable with respect to said first member, said relative movement being for the purpose of firmly placing the work against this first member and then acting to retain same in position therewith during progression. For this purpose there are provided members 170 and 171, having formed along one edge of each a series of teeth 172 and 173, respectively. Fixed to members 170 and 171 is a bridge 174 carrying, if desired, a projecting head 175, suitably shaped for forming an abutment for the work, and against which said work is firmly held during progression with relation to the tool-equipped means. The face 176 of said head 175 bears a definite relation to both the said tool-equipped means and the means for controlling and positioning the work. In the present embodiment the connection between the work and the driving means is effected through the racks 172 and 173. Worms 177 and 178 are shown in mesh with said racks 172 and 173, respectively. The worm 177 is connected through the gear train 179, with the gear 180 fixed to a clutch member 181 in operative relation to a clutch member 182, and freely mounted upon shaft 183, which has keyed to it the member 182. Fixed with relation to said clutch member 182 is a gear 183 which meshes with a wide faced gear 184 fast to shaft 185. Carried on said shaft 185 and fast thereto, is a bevel pinion 186 in mesh with bevel gears 187 and 188, freely rotatable on shaft 189. Slidable on shaft 189, but arranged to rotate therewith, is a clutch member 190, suitably placed for co-acting, when desired, with faces formed on the gears 187 and 188 to clutch same. Shaft 189 is arranged to be coupled to a suitable source of power, which in the present embodiment is shown as a motor 191. A yoke 192, operatively connected to a recessed portion of clutch member 190, has pivotally attached thereto a rod 193 suitably connected to a piston 194, working in cylinder 195, said cylinder being adapted for the use of fluid under pressure, a valve 196 serving to control the admission and exhaust of said fluid. A spring 197, shown coiled about piston rod 193, and acting against the piston face and the opposed cylinder end, serves to actuate the piston in one direction. It will be understood that the spring 197 acts to keep the clutch member 190 in engagement with gear 188 which, for example, progresses the members 170 and 171 and other parts hereinbefore and hereinafter described, while the piston, when actuated by the fluid under pressure, will cause the engagement of gear 187 by clutch member 190 for the reverse travel of said parts.

In fixed relation with worm 178 is a gear 200 driven from the gear train 201. In mesh with a gear in said train 201 is a gear 202, fixed to which is one of the miter gears 203 the other of said gears being fast on shaft 204. Said shaft 204 has fixed thereto miter gear 205 meshing with gear 206 which is fast to gear 207 in the train 179.

Means are provided for clutching members 181 and 182, such means being shown in part, in the form of a cylinder 210 suitably arranged for using fluid under pressure. A piston, operating therein, has conveniently coiled about its piston rod a spring coiled between either side of the piston and the adjacent cylinder head (which are not shown in detail being substantially the same as the arrangement in connection with cylinder 79 shown in Fig. 2), and adapted for returning said piston after it has been actuated by the fluid under pressure. Means are provided for maintaining said piston and clutch member 182 in position corresponding to that of disengagement, indicated generally by numerals 215 and 216, and substantially similar to that shown, in connection with the cylinder 79 (see Fig. 36) and need not be described in detail. A suitable valve 1220 is shown for controlling the fluid under pressure, for the movement of the piston in one direction, while valve 1221 is shown for a similar control of the piston in the opposite direction. A recessed collar 1222 is operatively connected with a yoke 1223, pivotally mounted, and connected by means of link 1224, to a yoke 1225, said yoke being in operative relation to a recessed collar 1226 fast to the shaft 183.

Means are provided, which together with other functions, serve to carry the work to, and press same firmly against head 175 mounted on bridge 174, and to hold said work thereto, as it is progressed through the machine. Said means comprise a bridge 230 which may be attached to and detached from the toothed members 170 and 171. The members 170 and 171, and the two bridges 174 and 230 constitute a carriage for handling the work. As shown herein the bridge 230 is provided with pivoted dogs 231 and 232, journaled on said bridge 230, said dogs being acted on by springs 233 and 234, respectively, which tend to cause the engagement of the said dogs with the racks 172 and 173 of the members 170 and 171. It will be understood that the construction of the toothed dogs 231 and 232 is such as to permit said bridge 230 to move toward the bridge 174, when desired, and as the work is firmly pressed against the head 175 of said bridge, the dogs will positively lock said bridge 230 to members 170 and 171, and keep it at rest with respect to bridge 174 during the progression movement. Also relative movement in the opposite direction will be prevented until the dogs 231 and 232 are thrown out of engagement with the rack teeth on the members 170 and 171.

The invention in certain of its features provides for moving the bridges, or equivalent parts, of the work progressing means independently of each other. In the present embodiment means are provided for moving the bridge 230 along its path of travel in both directions, independently of the bridge 174, when desired. The form of such means shown herein comprises cables 240 and 241, working over pairs of loose pulleys 242 and 243, coiled about driving drums 244 and 245 and returning to fastenings on bridge 230 over guide pulleys 246 and 247. Adjustments for regulating the proper tension of said cables 240 and 241 may be provided, if desired, such as turn buckles 248 and 249.

Suitable means for effecting the independent movement of bridge 230 are provided comprising drums 244 and 245 fastened to a shaft 250, which also has slidably mounted thereon, but rotatable therewith, a clutch member 251 suitably arranged to be actuated in one direction by a spring 252, under tension. In operative relation to said clutch member 251 is a worm gear 253 provided with suitable means for coöperation with the clutch member 251 when desired, and in a manner to be hereinafter described. Operatively connected with said worm gear 253 is shown a worm 254, fast to the shaft 255, which also has fixed to it a gear 256 meshing with the gear 257, loosely carried on the shaft 216. In fixed relation to the said gear 257 is shown a clutch member 258 capable of being operatively connected to clutch member 259, which is fixed to the gear 183. Actuating and controlling mechanisms are shown comprising a piston, in cylinder 210, the piston being operatively connected with shaft 183 in a manner substantially similar to that described for the operation of clutch members 181 and 182 and need not be explained in further detail. It will be understood that the actuation of the piston 211 will cause the clutch members 256 and 259 to be operatively connected, and through gear 184, shaft 185, gears 186, 187 and 188, together with clutch mechanism 190 and the motor 191, which together with the connecting mechanism just described will give the desired movements to the bridge 230.

In certain aspects of the invention, means are provided for effecting the various movements and feeds of the bridge 174 and of the bridge 230, and the combined feed or progression of said bridges. Such means are illustrated as comprising supports 265 and 266 on which are conveniently mounted flanged rollers 267 and 268, on which rollers the members 170 and 171, supporting the bridge 174, are guided and travel. As previously indicated the worms 177 and 178 working in rack teeth 172 and 173, of the members 170 and 171, progress said members 170 and 171 to and fro, along said series of rollers 267 and 268, or hold said members at rest thereon. Upon the supports 265 and 266 are carried rails 269 and 270, said rails not only acting as guides for the members 170 and 171 but also as supports and guides for the bridge 230, said bridge being arranged to travel thereon. Rollers 271 and 272 are shown attached to the bridge 230, and traveling on the face of the rails 269 and 270. Similar rollers 273 and 274 are conveniently arranged to rotate and bear upon the edges of the rail, while like rollers 275 and 276 are also mounted on said bridge 230 and bear upon the under side of the rail. It will thus be seen that the bridge 230 is held in alinement during both its independent and combined movements.

In the present embodiment the bridge 230 is utilized to carry the work toward the bridge 174, and also to firmly press the work and hold same against said bridge 174 through its contact head 175. The form of means provided for this, in connection with the parts hereinbefore and hereinafter described, consists of a contact head 280, shown in detail in Figs. 3 and 38, slidably mounted in guide 281 fixed to the bridge 230. For controlling the movement relatively to the bridge 174, in the direction of travel, there is shown a spring 283, conveniently coiled about rod 282 of said head 280. Any desired tension may be given to the said spring 283 by means of the threaded piece 284. A shoulder 285 on the head 280 positions said head with relation to the work.

The bridges 174 and 230, as previously indicated are movable either independently of each other or together. When the dogs 230 and 231 have been thrown in and locked to rack teeth 172 and 173 respectively, the bridge 230 is connected to, and movable with bridge 174. These two bridges and the connecting mechanism thus form, as already indicated, a carriage for firmly holding and controlling the work, both during its progression and while the operations are being performed thereon. When the carriage is progressed by the worms 177 and 178, the cables 240 and 241 travel idly as the drums 246 and 247 are not then operatively connected with the driving means therefor. It will be understood that the clutch members 181 and 182 and 188, 190 are at this time in engagement, thus operatively connecting the worms 177 and 178 with the motor 191, through connections hereinbefore described. As it may be desired to prevent the travel of the bridges 174 and 230 at the same time, the structure and the manner of operation of clutch members 181, 182 and 216, 259 shown herein, provide a means for positively obtaining such conditions.

One feature of the invention has for its object the independent bridge movements previously referred to. Suitable means are provided for effecting the temporary disengagement of the dogs 231 and 232 from their racks and as illustrated comprise spring pressed latches 290 and 291, pivotally mounted on the bridge 230 and conveniently arranged to be in operative positions with pins or lugs 292 and 293, carried respectively by the dogs 231 and 232. In position to control the release of these latches 290 and 291, there are shown levers 294 and 295, pivotally attached to the bridge 230 one end of each adapted to contact the respective latches 294 and 295, and the other ends being arranged to be actuated by the projection of rod 282, attached to the head 280. Suitable means are also provided for causing the release of toothed dogs 231 and 232 from their racks at the end of the travel, such means consisting of cam arms 296 and 297, pivotally mounted and so connected and arranged, that when the bridge reaches the desired extreme position at the end of the progressing movement, said cam arms 296 and 297 will throw said dogs 231 and 232 out of engagement with racks 172 and 173. During said operation the latches 290 and 291 engage pins 292 and 293 and thus maintain the disengagement of said dogs and racks, until released when desired.

In accordance with one feature of the invention, distance indicating devices are provided that may, at certain times if desired, control the position of the work progressively, and with respect to the tool-equipped means in order that the location of the operations upon said work may correspond to any desired and predetermined position, both relatively to one another and to an end or face of the work. For this purpose these devices are conveniently placed in operative relation with the work and the progressing means, and the illustrated form thereof comprises a scale 300 fixed upon the member 170 see Figs. 15, 16, 17 and 17ª. A scale 301 is shown fixed to a member 302 in a suitable manner. Said member 302 is shown of convenient shape such as of T section bearing in a groove or slot 303, underneath the shoulder formed thereon and fixed to part of the member 170. The scale 301 and member 302 are slidable along the slot 303 and relatively movable with respect to the fixed scale 300. In definite relation to the scale 301 is shown a suitable stop block 304, and means are provided for positioning a face 305 of said stop block 304 in definite relation with the scale 300. Said face 305 also bears a definite relation to the scale 301 at all times during progression. Means are also provided for firmly clamping the stop 304 relatively to the scale 300 and in the present form of such means, the block 304 is provided with teeth 306 which are adapted to engage with teeth 307, fixed relatively to the scale 300. The block 304 engages by pins 308 and 309 in annular groove 310 in a member 311 threaded on a stud 312. Fixed to the member 311 is an arm 313. It will be understood therefore, that by moving the arm 313 in one direction or the other, the block 304 through the teeth 306 and 307, may be brought into firm engagement and fixed relation with the member 170. This will serve to bring the face 305 into definite relation with a desired point on the scale 300. If desired the teeth 306 and 307 may correspond to divisions on the respective scales, thereby bringing the surface 305 to a definite division of the scale each time it is set.

According to another feature of the invention means are provided, coöperating with the foregoing means, for automatically positioning the work in accordance with the distance indications to which said indicating means are set. In the illustrated form thereof an arm, or other suitable member 315 is shown fixed to a support 316 provided with a tongue 317 working in a groove 318 in member 170. The support 316 is provided with a face 319 arranged to contact with the face 305 in the block 304. Means are also provided for fixing the support 316 firmly in position when desired, and also for releasing it for movement along its guideway or slot. In the form of said means shown herein a T shaped piece 320 is shown bearing under shoulders in the slot 318. The member 320 is shown having a projecting part 321 to which is connected by a pivot 322 a lever 323. Said lever 323 is provided with a surface 324 eccentric to the pivot 322. The support 316 is shown provided on its lower surface with teeth 325 which engage teeth 307. The said support 316 is also shown provided with pins 326 engaging a suitably shaped slot 327 in the lever 323. It will be understood that when the lever 323 is thrown in one direction, the surface 324 will press the teeth 325 into firm engagement with the teeth 307, through the clamping action of the upwardly drawn member 320. When the lever 323 is thrown in the opposite direction the member 320 presses against the bottom of the slot 318 and the teeth 325 on the block support 316 are moved clear of the teeth 307 and the structure is free to be moved along in its guiding slot.

The manner of operation of the distance determining devices just described is substantially as follows: The zero or other initial point, temporary or permanent, on the scale 300 is in alinement, or other predetermined relation with the head 175 of bridge 174 or with the end or face of the work which has been positioned with respect to said bridge. The block 304, having had its arm positioned to hold the teeth 306 out of engagement with teeth 307, is slid along until the face 305 shows on the scale 301 a reading equal or corresponding to the distance of the operation to be performed from the face of the work, or some reference line thereon, or an operation previously performed. The block 304, by movement of the arm 313 is then firmly clamped in position by the engagement of the teeth 306 and 307; the support 316 is then slid along until the face 319 contacts with the face 305, when the lever 323 is moved to firmly clamp this block in position. The arm 315 is thus positioned to coöperate with suitable mechanisms which will be described hereinafter to control the progressing means to bring the work into proper position with respect to the tool-equipped means and in accordance with the setting thus made. This series of operations may be repeated as desired, for subsequent positionings of the work. The distance between successive operations, or a reading corresponding in some manner thereto, may be read directly on the scale 301 from the face 319, and the block 304 clamped into position in accordance to said reading. This may be read when the successive settings are made. At the same time by reason of the scale 300 being in fixed relations to the face of the work, and to the bridge 174, the total distance from the face of the work to the last setting may be read thereon, from the face 305 or 319, thus acting as a check on the setting.

Means are also provided for indicating the over all length of the work for convenience in determining the length of the piece prior to the operations thereon. As shown herein these means consist of a pointer 299 carried on the bridge 230 and preferably on the slidable head 280, which is in relative positions with respect to the end of the work and conveniently arranged to show the reading direct on the scale 300.

As will be recalled the other end of the said scale is in exact correspondence with the other end of the work and consequently the coöperation of said pointer and scale will give the length of the work.

Means are provided by one aspect of the invention for compensating for variations in the length of the work from the desired dimension. This deviation may be due to variations in temperature when the work is cut off or to variations in cooling, or to other causes. A form of such means is accordingly illustrated in the present embodiment and is shown applied to the block 316. As shown in Fig. 14, it comprises a contact head 330, having a threaded shank 331 taking into said block 316. Said head 330 is provided with a scale 332. Means are also shown for holding the head firmly in adjusted position, said means comprising notches 333, corresponding to the scale, and having coöperating therewith a spring detent 334, which may also be provided with a pointer 335 reading on the scale 332.

The work may be found to be slightly longer or shorter than the nominal or specified length for the reasons stated. This may be ascertained by the reading of the pointer 299 on the scale 300. The operator can then set the head 330 by the pointer 335 to correspond to the excess or shortage in the work. The relation of the scale to the pitch of the thread on the shank 331 may be such that the error or variation can be distributed equally at each end of the work, if desired. The face 336 of the head 330 may be used to contact with face 305 on block 304.

In accordance with certain features of the invention, additional distance determining means of a different form are provided, which further provide for automatic repetition of the spacing of operations on the work, and for convenience this may be termed the dial spacer. The illustrated embodiment thereof (see especially Figs. 18 to 22) comprises a disk 350 in which may be provided a series of holes 351, spirally arranged and which may be angularly equally spaced and also indexed. This angular distance may correspond to the divisions on the scale 300, which for example, may be equivalent to sixteenths of an inch. A pin 352 is provided, and is adapted to be placed to any desired hole. Conveniently arranged, on the under side of disk 350 is a grooved spiral 353, corresponding to the spiral governing the positions of the holes 351. Adjacent to the grooved side of the disk 350 is an arm 354 fixed on a shaft 355. Slidably mounted on arm 354 is a member 356 carrying a pin 357 in operative relation with the groove 353, a lug 358 adapted to coöperate with the pin 352, a projection 359, and also a part 380 conveniently arranged for coöperation with the motor control to be hereinafter described. The arm 354 with its sliding member 356 is adapted to rotate with the shaft 355, and to permit of a longitudinal motion thereof. On the other end of shaft 355 fixed to rotate therewith but slidable relatively thereto is a drum 360 which carries a cable 361 running over idle pulley 362 and carrying a weight 363. Formed on the hub of drum 360 is an annular groove in which works a yoke 364 fast to a shaft 365. Adjacent to the arm 354, and loosely-mounted on the shaft 355 is a sleeve 370 suitably arranged in bearings 371. Fast to said sleeve is a disk 372 provided with a series of radial grooves 373, arranged to correspond with said series of holes 351 and so proportioned as to permit the reception and temporary, rigid retention of the projection 359 on the member 356. Also fixed to the sleeve 370 is a pinion 374 operatively connected with gear train 375, the gear 376 of which is fast to a shaft 377. Fast to said shaft 377 is a pinion 378 meshing with toothed rack 379 formed, for convenience, on the member 170 of the carriage, or work progressing means. It will thus be seen that the travel of member 170 will give a definite rotation to the disk 372.

Electrically connected with the motor 191 is shown a rheostat 381 provided with a series of resistance buttons 382 and an electrically dead button 383. A pivoted arm 384 is arranged to coöperate with buttons 382 and 383, and so placed as to be under the control of the part 380 hereinbefore mentioned. It will be understood that the movement imparted to the arm 384 by the said part 380 will cause it to have traveling contact with buttons 382 to decrease the speed of motor, and as it is carried to, and rests on dead button 383, to throw off its power and thus bring said motor to a stop, and also through the members 170 and 171 to bring to a stop the work progressing means and the progressed work carried thereby. An adjustable stop 390 is arranged to positively hold the progressing means in the desired position.

The manner of operation of the foregoing mechanism is substantially as follows: The pin 352 is placed, for example, in hole 366, corresponding to the movement desired to be given to the work to bring it to the position for performing the desired operation thereon, and which in this particular instance it may be desired to repeat. At this stage of the operation it is assumed that the work progressing means are at rest, the arm 384 being on the dead button 383 as shown by dotted line in Fig. 18. Through yoke 364 and its connected mechanism, the shaft 355, arm 354 and member 356 are then moved away from disk 372 by means, and in a manner to be hereinafter described. This will free projection 359 from a groove 373 of the disk 372 and by means of the weight 363 allow the said arm and member to be rotated until lug 358 meets the pin 352 in its new position in a hole 366. The pin 357 has governed the sliding action of member 356 to properly guide same to this position. Shaft 355 is then permitted to move longitudinally and the projection 359 connects with, and is rigidly held by, a groove 373 of the disk 372. The arm 384 is then operated by means described in connection with the tool-equipped means to throw in motor 191, thus progressing the members 170 and 171, which in turn rotate the disk 372 and the arm 354 together with the member 356 until the part 380 contacts with, and carries arm 384 to position over the electrically dead button 382. The motor is thus stopped and with it the progressing means and the work carried thereby. It will thus be seen that the distance traveled by said work corresponds to the distance from the set position of pin 352 to the stop 390. This series of functions may be automatically repeated as will appear hereinafter.

Means are provided for the delivery of the work from the machine after the completion of the work thereon. In the embodiment herein illustrated, certain of the arms 115 and 116 are fixed to a shaft 404, suitably mounted in bearings 405. Said shaft 404 also has fast thereto sectors 406 meshing with the worms 407 fast to a shaft 408. Said shaft 408 also has fast thereon bevel gears 409, each of which is in mesh with the gears 410 fixed on a shaft 411. A gear 412 fast to said shaft 411 is in mesh with a gear 413 which has formed thereon a bevel gear 414 in driving relation with the bevel gears 415 and 416. Said gears 415 and 416 are arranged with suitable clutching faces 417 and 418, and are loosely mounted about the shaft 419. Conveniently placed to permit of being operatively connected with either of said gears or to be disengaged from both, is a clutch member 420 slidably mounted on the shaft 419 but capable of rotation therewith. Suitable means for driving the devices above described are provided, such as a motor 421 connected with the shaft 419 through a suitable coupling. An annular groove 422 in the clutch member 420 has suitably connected therewith a yoke 423, fast on the shaft 424 also carrying fixed thereto an arm 425. A rod 426 connects said arm 425 with a piston 427 suitably arranged in the cylinder 428, said cylinder being adapted for using fluid under pressure. Springs 429 and 430, normally free from pressure, are conveniently placed for acting on the faces of said piston 427 and the opposed ends of the cylinder, such action being for the purpose of returning the piston 427 and with it clutch member 420, to an intermediate position. Valves 431 and 432 control the admission and exhaust of the fluid under pressure to and from the said cylinder 428. Controlling means, indicated by 433 and 434 for preventing rebound of piston when under action of either of the springs 429 or 430, and for maintaining the disengaged position of the clutch member 420, is substantially similar to other like means described herein and need not be further explained.

The invention, in one of its aspects, provides alining means which enter into operative relation with, and act upon, the work after the progressive movement thereof by the progressing means has been started. In the present embodiment the pairs of alining arms and their rolls which receive the work through the travel of the carriage are arranged each with its own valve control for its cylinder 130, the valve of which may be actuated by the work or the carriage. Thus, as the work progresses longitudinally it will enter between the rolls 123 and 124 of these particular alining devices, and then, just as it has entered, the disk 134 will move to bring up the rolls 123 and 124 against the work as shown in Fig. 9. In Fig. 37 the valve for controlling the fluid under pressure to said cylinder 130 is indicated by 442. The means for operating said valve 442 is suitably arranged for admitting the fluid under pressure to each of said cylinders 130 after the work has entered between the rollers 123 and 124 on the arms 115 and 116 controlled thereby. Operatively connected to each valve 442 is one arm of a bent lever 443, the other arm being pivotally attached to one end of a connection 444. A lever 445, pivotally mounted on a bracket 446, carried the other end of said connection 444, one arm of said lever having mounted thereon a spring-pressed dog 447 arranged in the path of a pin 441 on bridge 174. Said pin 441 is adapted to engage said arm so as to throw the valve 442 to admit the fluid under pressure to the cylinder 130. This dog 447 is pivoted and constructed in a suitable manner to permit the idle action with respect to said valve 442, on the return of bridge 174.

Means are provided for reversing the valve 442 for exhausting the fluid under pressure from the cylinder 130, (see Fig. 37) to permit the return of its piston under action of its spring and with it the actuating disk 134. Said means being for the purpose of leaving the lower ends of arms 115 and 116 free to move during the removal of the work from the machine. The means illustrated herein for effecting such function comprise a rod 450 slidably mounted in bearings 451 and carrying collars so arranged as to be in position to operatively engage lever 445. An end of the rod 450 is pivotally attached to an arm 451 and a spring 452, under tension holds said arm 451 against a stop 453 so that it may be actuated by pin 454 on the bridge 230 at the desired time. It will be understood that the passage of the bridge 174 during the progression of the work causes the centering means, at the delivery end, to be operated after the beam has passed between the rollers thereof, and also that the bridge 230 will release same after the operation has been completed on the work by the tool-equipped means.

In the form of the invention illustrated the means for controlling the action of the valve 432 (Figs. 1 and 35) is for the purpose of placing the work in delivery position so that said work may be engaged by lugs 598 of the discharging sprocket chains 597. An arm 460 suitably mounted, is operatively connected to the valve rod 432 and has pivotally attached thereto one end of a rod 461, the other end of said rod being carried by an arm of the bent lever 462. This lever 462 has also pivoted to it an end of a rod 463 whose other end is connected to a lever 464, suitably mounted and arranged in the path of a pin 465 on the bridge 230. The said lever 464 carries a spring pressed dog 466, pivotally mounted thereon, and adapted to be idly passed over by said bridge 230 during progression of the work and on the return of said bridge to be engaged and actuated thereby. Through the foregoing connections the valve is thus thrown at the desired time for admitting the fluid under pressure to cylinder 428. Also pivoted to lever 462 is a rod 467 connecting said lever 462 with a lever 468, fast on rock shaft 469 on which is also fixed an arm 470 carrying a pin 471 suitably positioned in the path of one of the supporting arms 400 and adapted to be engaged by said arm 400 as it approaches the discharging position. The return of said supporting arms 115 and 116 and the alining rolls to guiding position, is controlled by the valve 431. The means for performing this function is shown (see especially Figs. 1 and 2) in the form of an arm 475 operatively connected to the valve rod 431 and carrying, pivotally attached thereto a rod 476 suitably connected with an arm of the lever 477 pivoted at 478. Said lever 477 is connected by a pivoted rod 480 to the lever 478, pivoted at 479, and carrying a spring-pressed dog adapted for engagement by the bridge 174 on its return, and idly passed thereby during the progressive movement. An arm of the lever 477 is arranged in the path of one of the supporting arms 115 and engaged by said arm as it approaches the alining position. It will be understood that this latter device returns the valve 431 to its exhausting position, for the purpose of disengaging clutch member 418, and the coöperating gear, thereby bringing the arms to rest in the work guiding position.

Means are further provided by the invention for carrying away the work from the machine and the illustrated form of such means comprises a series of supporting rails 593. Conveniently placed adjacent to said rails are sprocket wheels 594 fixed to a rod 595 arranged to rotate in bearings 596, said wheels 561 carrying sprocket chains 597, said sprocket chains 597 are shown provided with a series of lugs 598 projecting to engage the work after the same has been placed on the rails 593. The sprocket chains 597 may be driven in unison, from any suitable source of power.

For convenience in the arrangement of the herein contained illustration of the invention, the supporting rolls 500 and 501 are shown mounted on suitable brackets fixed to a base. Also the alining rolls 502, 503 and 504, 505 are mounted on brackets 506, 507 and 508, 509, respectively, said brackets being pivotally mounted on a suitable base. In the case of the latter rolls the centering action is the same as described in connection with the delivery mechanism. This construction is shown for the reason that the work is carried beyond the rolls 508, 509, and 502, 503 and 504, 505, and hence the rocking action of the arms as described in the delivery mechanism is not deemed necessary. Another aspect of the invention provides means for returning both bridges into position to begin a new progressive movement in proper correlation with the mechanism coöperating therewith. Such movement, in the case of the bridge 230 may begin as soon as desired after the end of the progressing movement of the carriage, and in the present embodiment is when the work has been carried a sufficient distance for delivery free of parts of the structure. Accordingly, there is shown a cylinder 530 (see especially Fig. 13) adapted for using fluid under pressure and having a piston 531. A rod 532 attached to the piston 531 has conveniently coiled about it a spring 533, and the collars 534 and 535 are shown fast on said rod 532. A valve 536 controls the admittance and exhaust, to and from the cylinder 530, of the fluid under pressure. Operatively connected with the valve 536 is an arm 537, the other end of which is in the path of the bridge 230 and adapted to be engaged thereby. A spring 538 is suitably arranged and coöperates in said action to return the valve and hold same to position shown in Fig. 13.

Conveniently placed in the path of the collar 534 is a pivoted arm 539 to which is operatively attached a rod 540, connecting said arm 539 with an arm of bent lever 541. Another arm of said lever 541 is suitably connected to the valve rod 1220. There is also shown, in position to be acted upon by collar 535, an arm of lever 545 the other arm of said lever being connected to a lever 546 by a rod 547, said lever 546 having operative connection with the valve rod 196. It will be understood that each of the valves 196, 1220, and 1221 are adapted to remain in position until reversed in a manner to be later described.

The clutch member 251, in part, for operatively connecting the drums 244 and 245 with motor 191 when desired, is shown as provided with an annular recessed portion 550 in which is operatively placed a yoke 551. Said yoke 551 is suitably mounted fast on a rock shaft 552 to which is also fixed an arm 553 operatively connected with a piston 554 working in cylinder 555, adapted for using fluid under pressure, said fluid being admitted and exhausted to and from said cylinder by a suitable valve 556. An arm 557 connects said valve 556 with a pivoted bent lever 558 conveniently placed for actuation, when desired, by the collar 534 on rod 532. To an arm of said lever 558 is pivoted a rod 559 which connects the lever 558 with an arm 560 operatively attached to the valve rod 1221.

There is further provided by the invention means coöperating with parts of the mechanism just described to stop the bridge 230 on its return movement, and in addition may provide for a plurality of said positions, depending on the length of the work to be handled, should such positioning be desired. The present form of such means comprises a series of pivoted arms 561 (see Fig. 13) having slidably mounted and suitably guided thereon, a piece 562 carrying a spring pressed dog 563, said piece 562, being adapted to be set outwardly so as to place the operative face of said dog 563 in the path of a pin (not shown) suitably mounted on the bridge 230. A rod 565 connects one of the arms 561 with the lever 558 so that upon the actuation of any one of the dogs 563 set for coöperation with said pin 564, the valves 221 and 556 are thrown to exhaust the fluid under pressure from cylinders 210 and 555 respectively. A rod 562 connects the arms 561 one with the other. A spring pressed arm 566 is conveniently placed on the arm 561 for engaging with notches in piece 562 to hold said piece 562 in the actuating and free position. As will be understood the exhausting of the fluid under pressure serves to release the clutches through which the drums 244 and 245 are driven, and thus stop bridge 230 in the position desired. It is to be noted that each of the dogs 563 when suitably set, is arranged to be passed by the pin 564 when actuated, and to be idly passed by said pin during the progressive travel of the bridge 230.

The return movement of the bridge 174 may be caused, if desired, by the coöperation of the work and the valve rod 1220 and in the present embodiment a pivoted arm 570 is shown mounted adjacent to the rails 593 (see Figs. 13 and 35), the end of said arm being in position to be engaged and passed over by the work during delivery along said rail. Pivotally attached to the arm 570 is a rod 571, connecting said arm 570 with an arm 572, placed for operatively engaging the arm 539, and thus, on actuation, to throw the valve rod 1220 to admit the fluid under pressure to cylinder 210 and causing, thereby, the engagement of clutches 181 and 182. The clutch 190 having been previously positioned by the bridge 230 the motor 191 will consequently give the desired travel to the bridge 174 and travel same to the starting position. For stopping said bridge 174 in the position to begin progression of the work there is shown a pivoted arm 585 carrying a spring pressed dog 586, said dog 586 being suitably mounted so as to be in the path of a pin 587 on the bridge 174 and being adapted to be engaged and passed over by said pin 587 during the return of the bridge 174. The progressive movement of bridge 174 idly engages said dog and does not actuate the arm 585 at such time.

As contemplated by a feature of the invention, automatic means for starting the progressive feed of the work when said work is held by carriage formed by members 170, 171 and bridges 174, 230, are shown herein (see Figs. 2 and 13). These means comprise a lever 580 pivoted to head 175 of bridge 174 in such a manner as to project beyond the operative face of said head 175 so as to be in position for engagement by the work as it approaches said head. A rod 581 connects the lever 580 with one arm of the bent lever 582, the other arm of which has pivoted to it one end of a rod 583 suitably guided in brackets 584 conveniently mounted in the bridge 174. The free end of said rod 583 is suitably placed for engaging an arm of bent lever 585. Another arm of said lever carries a spring pressed piece 586 conveniently placed for actuation by a lug 587 on the bridge 174. A rod 588 is pivoted to the lever 585 and connects same with a bent lever 589, said lever 589 also having connected to it a rod 590 suitably fastened to lever 541 which is operatively connected to the valve 1220. It will be obvious that a movement of the rod 580 by the work will cause the valve 1220 to admit the fluid under pressure to cylinder 210, thereby causing the engagement of clutches 181 and 182 and connecting the worms 177 and 178 with the motor 191 for the progression of the work.

Various forms of tool-equipped means may be provided, so far as concerns many features of the invention, and in the present embodiment one form of such means is shown, by way of illustration, consisting of punching means. Said means is also shown especially adapted to operate on a particular kind of work, such as an I beam, or other angled or flanged forms. Said tool-equipped means is in definite relation to both the work and the work progressing means, including the space indicating devices, for the purpose of locating the operations upon the work according to the desired predetermined settings. In addition the positioning or centering means determines and maintains other relations between the work and the tool-equipped means. Other features of the invention further provide means for bringing interchangeably into operative relation different tools, and in the illustrated embodiment there are shown means for maintaining a plurality of punch blocks so that any one of the series may be brought quickly into operative relation, positively placed and arranged in connection with other parts for performing the desired function or series of functions. It is further contemplated to provide, if desired, corresponding die blocks which operate in the same manner. Also the arrangement of the parts is such that, if desired, a fixed and definite relation is obtained between these series of blocks so that in a selection and positioning of the one, its coacting member or members is controlled and positioned accordingly. The usefulness of this will be obvious, especially in certain cases as it may be desired to vary the sizes or shapes of holes in a single piece of work, or to save operations by carrying a plurality of punches or other tools in a single block or to otherwise vary them or their relation. It will be understood that, if desired, the blocks in each set may be interchangeable therein, to permit re-arrangement, changes, additions or other variations thereof.

In the present embodiment a series of punch blocks 600 are shown, slidably mounted in ways 601 and 602. If desired, friction lessening devices may be provided to facilitate the shifting of said blocks, such devices in the present form, comprising rollers 603 mounted upon the sides of said blocks 600 and running on the ways 601 and 602. Shoulders for transversely maintaining the alinement of said blocks 600 are further provided, in the present instance the sides 604 of the blocks acting as such. For connecting the train of blocks together, and to give movement of the series of punch blocks as a whole, for the purpose of bringing the selected block to operative position, means are provided for connecting them together, and as shown herein said connections comprise a male member on one end and a co-acting female member on the other end of each block in the form of T-shaped connections 605. To permit, further, another movement of any block which has been placed in operative position to and from the work in performing an operation thereon, said female member on the block is arranged to allow the removal and entrance of the T shaped part, and as shown, the slots are open from one side of the block to the other thus forming a continuous passage-way for said part. The ways 601 and 602 are shown interrupted at the operative position, the guides for the block at this point being part of the tool-operating mechanism, and will be described in connection therewith.

In accordance with the feature of the invention which contemplates the longitudinal movement of the series of blocks 600, in the present embodiment there is shown formed or fixed to a side of said block 600, toothed members 606, suitably arranged to form a continuous rack when the blocks are locked together. A pinion 607 is shown fast to shaft 608, rotatably mounted in bearings 609 and 610 (see especially Figs. 24 and 33). There is carried also by said shaft 608, and fixed thereto, a gear 611 in driving relations to a gear 612 fast on a shaft 613 which is conveniently journaled in a frame 610. Attached to said frame 610 and suitably arranged with respect to the shaft 613, is a disk 614 provided with a series of holes 615 corresponding to the blocks 600 (see especially Figs. 30 to 33) each block 600 in the train or series is represented by two of said holes for the purpose of selection when a block travels in either direction with respect to the operative position. Further, if desired, the sets of holes may be spirally or concentrically arranged with respect to the shaft 613, and are so shown in Fig. 30 of the drawings. Fixed to said shaft 613 is an arm 616 upon which is slidably mounted a member 617 and carrying a pin 618 fixed on said member 617 (see especially Figs. 30 to 32). Groove 619 is shown formed in the face of disk 614 adjacent to the arm 616 and suitably arranged to correspond to the series of holes 615. Slidably mounted on member 617, to allow of transverse travel with respect therewith, is a piece 620 with faces 621 and 622 adapted to contact with a selecting pin 623 when placed in any of the holes 615. Formed on one side of the piece 620 is a rack 624 with which meshes a wide face pinion 625, whose shank bears suitably in a lug 626 fast on the arm 616. Fixed on said pinion shank is shown a cam piece 627 whose working faces are adapted to operatively contact with faces 628 conveniently formed on a collar 629. Said collar is shown provided with an annular recessed portion 630 in which pins 631, of a yoke 632 engage (see especially Fig. 33). The lower end of said yoke 632 is adapted for engagement with an annular groove 633 formed in a clutch member 634, slidably mounted on a shaft 635, but arranged to rotate therewith. A spring 636, under tension, and bearing against said member 634 and a collar 637 fast to shaft 635, provides the actuating means for clutching the member 634, when desired. A gear 638 loosely mounted on shaft 635 and operatively adjacent to said clutch member 634, has a suitably shaped face for co-acting with the clutch member 634. In mesh with said gear 635 is a gear 639 fast on a shaft 640, said shaft also having fixed thereto a worm wheel 641 in driving relation with a worm 642 (see especially Figs. 2, 33 and 34). Said worm is shown operatively connected, through a shaft 185, gears 186, 187 and 188 together with clutch member 190 with the motor 191, when clutched in a manner as described. Fixed with relation to said worm wheel 641, is a gear 643 operatively connected to the train 644 in driving relation with the gear 612 fast to the shaft 613. For controlling the clutching mechanism an arm 645 is shown fixed to the pinion 624 and suitably arranged for manual operation. It will thus be seen that pinion 607 and arm 616 may be placed in driving relation with the motor 191 for actuation when desired.

The mechanisms just described may be operated substantially as follows: The pin 623 is placed in the hole 615 corresponding to the block which it is desired to bring into the operation position. Arm 645 is swung so as to present the depression (see Figs. 30, 31 and 32) in cam piece 627 to portion 628 of the collar 629. This permits the clutching of member 634, under actuation of the spring 636, with the face on gear 638. It will be understood that either at this time or previously the clutch member 190, has been operatively connected with such of the gears 187 or 188 as will give the desired direction of travel to the block to be used. Also that the clutch mechanism has been disconnected from the work progressing means in order that the same may be in a condition of rest. Through gear 641, gear train 642 and the gear 612, the arm 616 is carried until either one of the faces 621 or 622 contacts with the pin 623. It will be further understood that the pin 618 has guided the supporting piece 617 for block 620, so as to present a face on said piece 617 for contacting with the stop pin 623. There being provided sufficient additional travel to the arm 616, after piece 620 has contacted with said pin to cause the pinion 625 to rotate, in view of its operative connection therewith. Through the rack 624 this rotation actuates cam faces 627 in a suitable manner so as to slide collar 629, by means of the contacting portions 628, along shaft 613, thus the yoke 632 is made to actuate the clutch member 634 and disengage same from the driving gear 638. It will be seen that the selected punch block has thus been positively and accurately placed in the operative position in the tool-operating means. As has been previously mentioned there are also provided, to co-act with the aforesaid punch block 600, corresponding die blocks and means for positioning same with respect to the work and said punch blocks. For operation in connection with the form of work illustrated herein, there are shown a plurality of die blocks 650 and 651 in independent series. (See especially Figs. 23, 24, 25 and 33). It will be understood, however, that in cases where the operations are performed, in the present case, on but one side of the web, or in other cases on work of different shapes such as channels for example, it might be desired to use but one die block in connection with the punch block during the operation on the work. For guiding and otherwise keeping in alinement said die blocks there are shown guide rails 652, 653 and 654, 655, suitably arranged relatively to the tool operating means, the punch blocks, the work and the block driving mechanism. For the purpose of allowing the sets of blocks to travel as units, as well as to permit placing said die block or blocks in operative position, the blocks 650 may be provided with interlocking portions, shown of T shape, so arranged as to permit any desired block to travel transversely and clear of the adjacent blocks. In the case of blocks 651 a similar construction is shown so arranged as to permit the lowering of the selected block and clear of the adjacent blocks previous to a transverse travel to operative position. It will be understood that the locking devices just mentioned are of a construction substantially similar to that described in connection with the punch block. Supporting rails 652, 653, and 654, 655 are shown interrupted substantially similar to the ways guiding the punch block for the purpose of allowing the actions referred to above.

The die blocks 650 and 651 are provided with toothed portions 656 and 657, respectively, conveniently placed thereon and so formed as to make substantially a continuous rack when the blocks are locked together. Meshing with said teeth 656 in the die blocks 650 is shown a pinion 658, fast to shaft 659 suitably mounted in bearings 650. Said shaft also has fixed thereto a miter gear 661 meshing with miter gear 662 carried fast on the shaft 663, said shaft 663 being suitably mounted in bearings 664. The shaft 663 also has fast thereon a miter gear 665 in mesh with miter gear 666 fast to a shaft 667, conveniently mounted in bearings 668, said shaft 667 also carrying fixed thereto a pinion 669 operatively connected with the teeth 657 of the blocks 651. On the shaft 663 is also fast a gear 670 in mesh with the gear train 644. It will be seen, consequently, that in placing the pin 623 in position for selecting the desired punch block, there is also selected the corresponding die block or blocks and also that as the punch block is carried to the operative position, the die block or blocks will be carried thereto substantially at the same time.

The tool-operating means hereinbefore alluded to as forming a part of the invention are illustrated in the present embodiment as being, in part, suitably supported and positioned on a housing 700, and in part on other conveniently arranged supports. As illustrative of actuating means for the tool-equipment there is shown a shaft 701 suitably carried in bearings 702 and 703 in housing 700 the outer end being supported and being arranged to rotate in bearing 704 of the bracket 705, conveniently supported from said housing 700.

In order that the operation of the tool-equipped means may be in accordance with the positioning of the work, and in other desired relations in connection therewith, there is provided suitable clutching means. A form thereof is shown as comprising cam disk 710 fast on the shaft 701. A clutch ring 711 is loosely mounted on sleeve 712 which is fixed to shaft 701, said sleeve being provided with a series of slots 713 in which rollers 714 are loosely mounted. A spring 715, fast to sleeve 712 and under tension, is arranged to give clutch ring 711 a sufficient amount of rotation to place rollers 714 in contact with cam disk and inner face 716 of a constantly rotating gear 717. A lug 720 is formed on the ring 711, and suitably placed in operative relation to a face 721 thereof, is an arm 722 pivotally mounted on the bracket 705. Arranged to contact with the face 721 is a spring-pressed pin 723 carried in arm 722, the stop 724 limiting the motion of the pin 723 as it projects from arm 722, when free from the lug 720. A spring pressed plunger 725, carried in a lug formed on the arm 722, is arranged to press against a lug 726 fixed on the bracket 705, said pin and lug acting to hold the arm 722 in position to engage the lug 720, of clutch ring 711, and to hold said ring from rotation. A projection 727 of the arm 722 has pivotally attached to it, a connection 728, one end of which is operatively attached to an arm of the bent lever 729 pivotally mounted on housing at 730. Pivoted to the said housing 700 is a bent lever 731, an arm of which carries spring pressed dog 732, operatively arranged in relation to the face 733 of bent lever 729, and capable on actuation, of engaging said face 733, and in rocking bent lever 729 to swing clear of the face 733. This it will be seen causes the escapement of clutch lug 720 but permits the immediate return of pin 723 to stop shaft 701 after substantially one revolution. The return of the actuating lever 731 may be governed by means hereinafter described, and is dependent on said means, and it will be understood that the dog 732 idly passes face 733 when returning to the actuating position. The other arm of the lever 731 carries one end of rod 734, the other end being suitably attached to a pivoted arm 735, arranged for manual operation, and to which is also fixed a foot pedal 737. A spring 738, under tension, returns arm 731 to actuating position. Fixed to the rod 734 is a lug or collar 739, the purpose of which will be hereinafter explained. It will be seen that under certain conditions, if desired, the clutching of shaft 701 may be under the direct control of the operator.

Suitable means are provided for suitable power to actuate the tool-equipment. The illustrated form comprises a motor 740 operatively connected to gear 717 through gears 741, 742, and 743. A shaft 744, which has fast to it the gears 742 and 743, carries also a fly wheel 745. It will be obvious that a continuous rotation of the motor 740 will meet the conditions described hereinbefore.

To effect the positive actuation of the means performing the operations on the work, such means are illustrated as comprising, in addition to the foregoing, a properly proportioned member 750 on the shaft 701 and if desired eccentrically positioned with respect to the axis of said shaft 701. Rotatably sleeved, and loosely mounted on said member 750 is a pitman 751, said pitman being pivotally attached to a block 752 slidably guided in ways 753 and 754 of the housing 700. Adjacent to said block 752, and also slidably mounted in said ways 753 and 754, is a suitably arranged block 755 which is adapted to hold the selected punch block and is so shaped on one end as to provide a continuation of the ways 601 and 602. It will be understood that said block 755 substantially fills the interrupted section of said ways. As shown the end of the block 755 is T shaped and serves to keep the punch block in proper position and alinement during the travel of the series of blocks, and further controls the movement of the operating punch block to and from the work. If desired, means may also be provided for positively positioning the block relative to its support and the work, and prior to performing the operation thereon. In the embodiment illustrated such means are shown as comprising pins 770 and 771 slidably mounted in the block 755 and arranged to coöperate with recesses 772 and 773 in the punch block 600. In operative relation with the head 774 and 775 of said pin, are cam slots 776 and 777 fixed to housing 700 and suitably proportioned to throw said pins into the punch block as the supporting block descends and to retract said pin clear of the punch block as the supporting block returns after the operation.

In one aspect of the invention means are provided for automatically positioning the punch and die blocks that have been moved into operative relation with its actuating mechanism, and such other functions as may be necessary or desired in connection with operating on the work or in connection therewith. For these purposes there is shown a cam shaft 800, intermittently driven, as desired, by a clutch 801, substantially similar to that described in connection with the driving means for shaft 701 and need not be described in further detail (see Figs. 24 and 29). The arm 802 in part controlling the clutching of said mechanism is shown as having a depending member 803 operatively positioned with respect to a pivoted lever 804, fast on a rock shaft 805 which is suitably mounted in bearing 806. One arm of said lever 804 has pivotally mounted thereon spring-pressed dog 807 arranged so as to actuate arm 802 for releasing the ring of clutch 801, and to idly return to the actuating position when desired. A spring 810 under tension has one end fastened to the lever 804 for returning said lever as described. The cam shaft 800 is arranged to be stopped intermediate of its complete rotation to allow other functions to be performed while the means positioned during the first part of the rotation are rigidly held as desired. Accordingly there is shown a second pivoted arm 815 arranged to be in the path of clutch ring 801 for the purposes set forth. The construction and action of this arm is substantially similar to the other clutch controls and need not be further described. Conveniently arranged as part of the arm 815 is a member 819, with which the spring pressed dog 978 of a pivoted lever 979 coacts to permit the complete rotation of shaft 800, a connection 974 is attached to lever 979, connections for actuating said lever being later described. If desired, means for preventing a rebound of the shaft 800 may be provided and such means is shown as comprising a tooth wheel 825, fast to said shaft 800, and a spring pressed detent 826 in coöperation therewith. Further connections and means for actuating the above mechanism will be later described.

There are further shown herein means for operatively positioning the punch and die blocks relatively to the work. The illustrated form thereof comprises (see Figs. 23 and 27) arms 830 and bent lever 831 fast to shaft 832, and arm 833 and bent lever 834 fast to shaft 835, said shaft being conveniently journaled in the housing 700. Connecting one end of each of said arms with the supporting block 755 are shown links 836, 837 and 838, 839 respectively. Rod 840 is pivotally attached to ends of bent levers 831 and 834. Fast to shaft 835 is a lever 841 carrying one end, the connection being pivotally arranged on an arm of a bent lever 843 suitably mounted on housing 700. A rod 1844 connects another arm of said lever 843 with cam lever 844 suitably pivoted on housing 700, a roller of said lever 844 being operatively placed with respect to a cam 845 fast to the shaft 800. It will be understood that the selected punch block 600, under control of the cam 845, will thus drop the punch block upon the work and will positively raise the block therefrom at the proper time. For operatively connecting the punch block support 755 and the block 753 for the actuation of said punch there is provided (see Figs. 23 and 28) a gag 850, guided in brackets 851 and 852, fixed to said block 752, said gag being arranged to be projected between the adjacent faces of said block 752 and the support 755, substantially filling the space created by the dropping of the punch block upon the work. Projections 853 and a face of gag 850 are suitably placed to embrace one end of bent lever 854 pivoted on a bracket 855 fast to the housing (see Figs. 23 and 24). Said lever 854 has attached to it a rod 857 which is also connected to an arm 858 fast on a shaft 859, said shaft 859 being rotatably mounted in bearings 860 and 861 fixed on the housing 700 the lower end of said shaft 859 has fixed thereto a cam lever 862, which carries roller 863 in operative relation to a cam 864 fast to the shaft 800. It will thus be obvious that, during the part of the rotation of said shaft 800, and at the proper time, as previously stated the gag 850 will operatively connect the block 752 and the support 755 which carries the selected punch blocks. It will further be understood that previous to the above action the support and its engaging punch block has been lowered to the operating position with respect to the work. With the parts in the described position, it is obvious that a rotation of the shaft 700, through the connecting parts, will give to the punch block a desired action for performing the operation on the work.

As has been indicated previously, additional means provide for the proper and accurate placing of the die block or blocks relatively to both the coöperating punch block and the work, and also embody supporting devices for said die block, during the operations on the work and means for returning the die blocks to their normal positions in the series, after the operations therewith. Further the interrupted guides for the travel, to and fro, of the blocks in series are continued for the support of said blocks as will be described hereafter. A base 870 suitably placed adjacent to the interrupted portion of the ways 650 and 653, has formed thereon guiding portions 871 to insure the exact and accurate positioning of the blocks 650. Within the interrupted portion of the ways there is shown a piece 872, slidably mounted and guided in groove 873 of the block 870. Said piece 872 has formed thereon a tongue 874 which is arranged to engage a suitable groove in the blocks 650 to act as a guide for said blocks during their passage to and from the work, and also serves as the means of carrying the selected block to operative position and returning same to its position in the series when desired. Fixed to piece 873 is shown a rod 875 suitably arranged to slide in guides 876 and 877, mounted respectively on base 870 and the housing 700. Suitably coiled about said rod 875 is a spring 878, under tension, the end of which rests, for convenience, against guide 876 and the collar fast to the rod 875. A projection 879 of said rod 875 is operatively placed within jaws 880 of a lever 881, which carries a cam roller 882 suitably placed in operative relation to a cam 883 fixed on a cam shaft 800.

With respect to the die block 651 there is shown a supporting member 890 within the interrupted portion of ways 654 and 655 and in proper relation thereto, said member 890 being slidably mounted in a base 891. The face of said member 890 adjacent to the die block 651 is provided with a tongue 892 adapted to co-act with a corresponding groove in said die block 651 for guiding same during the travel in series. Yoked in an annular groove 894 of said supporting member 890 is shown a bent lever 895, a depending arm thereof having pivotally attached thereto a rod 896, said rod being connected to cam lever 897 pivotally mounted in the housing 700, said cam lever carrying a roller 898 in operative relation to cam 899 fast on the shaft 800. Spring 900, under tension, serves to assist in the desired action. A cut away portion 901 of the member 890 is adapted to receive a piece 902, said piece being provided with a tongue 903 which at the proper time may be operatively connected to the die block 551 for the purpose of controlling the same in its movement to and from the work and during the operations thereon. Attached to piece 902 is shown rod 904, slidably mounted in guides 905 and 906 which are fixed on base 891 and housing 700 respectively. A projection 907 on said rod 904 is arranged to coöperate with jaws 908 of a lever 909 which is fast on rock shaft 910, said shaft 910 being suitably journaled in bearings 911. A spring 912, under tension, is shown attached to lever 909. Fixed also to the shaft 910 is an arm 913 pivotally carrying an end of a rod 914, the other end of which is connected to a bent lever 915, pivotally mounted at 916, an arm of said lever 915 having attached thereto a roller 917 in operative relation to a cam 918 fixed on the shaft 800. Thus it will be seen that, under actuation of cam shaft 800, the member 890 supporting the selected die block 651 will lower said die block to operatively connect it to piece 902, said shaft then causing by the aforementioned mechanisms, the actuation of die blocks 650 and 651 so as to place said die blocks in position with relation to the selected punch block 600 and the work, and to rigidly and precisely hold the die blocks in the ways 871, 872 and 892. The bases 870 and 891, respectively, support the blocks during the performances on the work. Further the faces of the die blocks which are adjacent to the flanges of said work on which the operations are to take place, are shown substantially corresponding to the inclination of said flanges, when desired, thus supporting the work during the action thereon.

It will be recalled that the cam shaft 800 and its clutches have mechanisms suitably arranged for a plurality of escapements during its complete rotations. The normal or zero position of the cam shaft indicated in Fig. 29 provides, for the parts controlled thereby to be in position to admit the free progression of the work, and also for the travel of the series of punch and die blocks to and fro, as desired. As shown in the illustrated form of the invention the first release of the cam shaft 800 is governed by the position of the work relative to the tool-equipped means and with reference to the position of the operation to be performed on said work. The second release and actuation of the cam shaft 800 is made independent upon the completion of said operation and the withdrawal of the tool from the work. Also the further progression of the work may be governed, if desired, by said shaft at the proper time. Accordingly the rock shaft 805 has fixed to it an arm 950 carrying, pivotally attached thereto, a connection 951 suitably fastened to an arm 952 of the bent lever 953. On another arm 954 of said lever is pivotally mounted an arm 955, capable of retention in a position operatively adjacent to the rheostat arm 1100.

A spring pin 956 mounted in arm 955 serves to hold said arm in operative position, when desired, and also permits the release of said arm for the purpose of placing the same out of the path of said lever 1100. Fast also to the shaft 805 is an arm to which is pivotally connected a rod 961 suitably attached to an arm of the bent lever 962, said lever being pivoted at 963. An arm of the lever 962 has mounted thereon an arm 964 held in operative position relative to the piece 380 by means of a spring pin 965 as in the case of the arm 855, this construction is for the purpose of the actuation of rock shaft 805, independently, by other means, when desired. It will be understood that the rotation of cam shaft 800 is accomplished through convenient connections at 975 with a suitable source of power.

The means for releasing the shaft 800, at the intermediate position, comprises a bent lever pivoted at 966 the arm 967 of which is suitably placed in operative relation with a pin 968 carried on the block 752. Pivotally mounted on the arm 969 of said lever is a rod 970 which is suitably attached to arm of bent lever 971 pivoted at 973. A spring 972, under tension, is attached to the arm of the lever 971. Connecting an arm of said lever 971 with an arm 973 is a rod 974. A rock shaft 975, suitably mounted in bearings 976, has fixed thereto an arm 977. Pivotally carried on said arm 977 is a spring pressed dog 978 adapted to actuate the escapement arm 815, when desired, in a manner similar to corresponding actions hereinbefore described.

As hereinbefore stated, in connection with the dial spacer, means are provided for repeating the settings of said mechanism, if desired. In the present embodiment said means act on the yoke 364. With this in view there is shown fixed on the rock shaft 365 an arm 980 to which is pivotally connected a rod 981, suitably fastened to a lever 982, pivoted at 983, and which carries an arm 984 having a roller 985 in operative relation to a cam 986 on the cam shaft 800. A spring 987, under tension, is attached to said yoke 364, for coöperation with said cam 986. In connection with said mechanism there is also provided means for actuating the arm 384, at the proper time, to start the motor 191 for progressing the work to a new position as indicated, in this instance, by the dial spacer after the completion of the previous operation on said work. Such a device is shown as comprising an arm 990, operatively positioned in the path of the arm 384, said arm 990 being fast on the rock shaft 991, suitably mounted in bearings 992. On said rock shaft 991, and fast thereto, is a lever 993, said lever carrying a roller in operative relation to a cam 994 fast to the shaft 800.

The invention also contemplates the automatic action of the tool-operating means, and accordingly a form of such means is shown comprising a lever 1000, pivoted at 1011 on the housing 700, one end of which is suitably placed with reference to the lug or collar 739, hereinbefore mentioned. A spring 1002, under tension is suitably attached to said lever 1000. For engaging the collar 739 at the proper time there is shown mounted on the lever 1000, and so arranged that, if desired, it may be withdrawn, and thus causing the release of the shaft 701 to be under the control of other means hereinbefore described. Another arm of said lever 1000 carries a roller 1003 in operative relation to a cam 1004 fast on the shaft 800. Suitably placed also with reference to the collar 739, is a lever 1010 pivoted on the housing 700 at 1011 and acted upon by spring 1012 under tension. Said lever 1010 carries a roller 1013 in operative relation to a cam 1014 fixed on the shaft 800. With the proper timing of the cam 1014 it will be obvious that the trip of the mechanism operating upon the work, when so actuated manually, will be controlled so that the parts and the work are in the desired position before the tool is permitted to operate on said work.

The functions of the principal mechanisms and their operations in the present embodiment of the invention will now be described in such sequence as to indicate one method of progressing the work from the source of supply to the delivery, and the performance of the desired operations on the work itself.

The work may be supplied to the rails 1 in any suitable manner so that it is in position to be engaged by lugs 3 of the conveyer chains 2 and carried along thereby, as desired, to a position within range of the lugs 9 and shown substantially by dotted lines in Fig. 5. The bridge 230, after passing the tool-equipped means engages the arm 224 which, through the connecting mechanism, throws the valve 80 to a position for admitting the fluid under pressure, to one end of cylinder 79. The piston 78 is thus actuated and causes clutch members 68 to engage the gear 65 and operatively connect motor 67 with worms 58. The shaft 54 is rocked thereby and the arms 50 and 51, and 115, 116 are brought to receiving position. As said arms approach this position, the arm 229 is engaged by arm 50 and, through the connecting mechanism, throws valve 80 to exhausting position, thus permitting the spring 83 to return piston 79 and thereby disengaging clutch member 68 and the gear 65. The motor 67 and worm 68 being disconnected the arms are brought to rest in a position corresponding substantially to that shown in Fig. 5. Also during the approach of arms 50, 51 and 115, 116 relative movement between said arms has opened the same a sufficient distance to permit the reception of the work. After the bridge 174 has reached the normal or starting position, the shaft 16 is released and clutched, arm 28 being operated and obtaining this condition by rocking arm 20 out of engagement with lug 23 of the clutch 19. The actuation of shaft 16 causes lugs 9 to pick up the work and carry it forward substantially to the position shown in Fig. 6. The second engagement of the work with dog 105 causes said dog to actuate the arm 165 and, through the connecting mechanism, throws valve 81 to admit the fluid under pressure to the opposed end of cylinder 79. As the piston 78 is actuated thereby, the clutch member 68 engages gear 64, thus connecting the worm 54 with the motor 67 and rocking shaft 54 in the direction opposite to that described above. The raising of the arm causes same to engage and pick up the work, the arms 51 and 116, during this movement closing relatively toward the supported work. As said arms approach the position in which the work is progressed, the arms 50 and 51 are in position to support the work, in the present form, under the upper flange. At this time the arm 166 is engaged by the arm 51 and through the connecting mechanism the valve 81 is reversed, exhausting the fluid under pressure from cylinder 79 and thus permitting the return of said piston, under actuation of spring 82, and causing the disengagement of clutch member 68 and the gear 64. The motor 67 and the worm 68 being disconnected thereby the arms 50, 51 and 115, 116 are brought to rest in the desired position, approximately that in which the work is progressed and substantially the position in Fig. 9. About the same time the valve 139 is thrown to admit the fluid under pressure to cylinder 130, thereby actuating the piston 131, and causing disks 134 to rock arms 115 and 116 for the purpose of carrying the rollers 123 and 124 against the work to center and position said work with relation to the tool-equipment. It will be convenient at this time to bring the desired punch and die blocks, into the operative position, and also to set the distance determining devices for spacing the operations to be performed on the work. Upon the completion of these settings the drums 244 and 245 are clutched at 259 and 251, through the operation of valves 221 and 556, said valves admitting the fluid under pressure to cylinders 210 and 555 respectively. The motor 191 is thus connected operatively to the drums 244 and 245 and the bridge 230 is started thereby toward the centered work. Upon the head 280 contacting with the work, said work is moved toward the head 175 on bridge 174, and as it nears said head 175, engages lever 580 which, through the connecting mechanism, causes the valve 220 to be thrown for admitting the fluid under pressure to the cylinder 210. The actuation of piston 211 thereby clutches the members 181 and 182 thus connecting the motor 191 with the worms 177 and 178. Also said actuation of arm 585 causes a reversal of the valves 221 and 556 thus disengaging the clutches at 259 and 251, for the purpose of permitting the idle revolutions of the drums 244 and 245 during the progression of the work. At the same time the abutting of the work against the head 175 causes the relative movement of the head 280 and its supporting bridge 230, the actuation of rod 283 releasing the toothed dogs 231 and 232, said dogs thereupon engaging members 170 and 171 by their coöperation with the teeth 172 and 173.

The distance determining devices having been set for positioning the work for the first operation thereupon, said work is progressed by the combined movement of bridge 174, members 170, 171 and bridge 230, until arm 315 meets the rheostat arm 1100. The further travel of the mechanism in contact with said arm causes the motor 191 to slow down and also said arm 315, at the proper time will reverse valve 220 to disengage the clutch members 181 and 182. These functions will bring the carriage and the work to rest in the predetermined and desired position, the stop positively and accurately holding said work in this position.

As the travel of the work has been such as to bring the same in the operative position with respect to the tool-equipped means the shaft 800 is now released and the punch block descends, the gag 850 is thrown in, and the die blocks moved to their operative position with respect to the punch block and the work, the desired operation upon said work being then performed. The second release of the shaft 800 returns the blocks to their normal position and the work is ready to be progressed for subsequent operations thereon. The new setting of the distance determining devices is made and if other blocks are desired to be used these are fed to the operative position prior to the connection of the worms 177 and 178 with the motor 191. The operations in connection with the progression and the performances may be repeated as desired, until the completion of the functions on the work.

After the passage of the work past the tool operating position, the bridge 230 engages the arm 537 thus throwing the valve 536 and thereby admitting the fluid under pressure to the cylinder 530. The actuation of piston 531 follows, reversing the clutch member 190, throwing valve 220 to exhausting position for releasing the clutches 181, 182, throwing out toothed dogs 231, 232, throwing valve 221 to admit the fluid under pressure to cylinder 210 for clutching members at 259 and 251 for connecting the drums 244, 245 with motor 191. Thus the bridge 174 and the work is at rest, and the bridge 230 started on its return travel. During the return of said bridge 230, contact with the arm 464 causes, through the connecting mechanism, the valve 432 to be positioned to admit the fluid under pressure to cylinder 428. This condition actuates the piston 427, thereby clutching member 420 with gear 415 and connecting the motor with the worm 407. This causes the rocking of shaft 404 and the arms carried thereon, and the work is thus delivered to the rails 593. Lugs 598 engage and carry the work away from the machine. As the arms 400 approach the delivering position, the engagement of said arm with lever 470 reverses the valve 432, exhausting the fluid under pressure from cylinder 428 and thus permitting spring 429 to return piston 427, and causing the disengagement of clutch member 420 and gear 415, said action disconnecting the motor 421 and worm 407 and bringing the arms to rest in the desired position. During the approach of arms 115 and 116 to this position they open out permitting the withdrawal of the work from therebetween, by reason of the pin on arm 116 striking the stop on the frame as shown in Fig. 35.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A machine for operating upon structural shapes including in combination tool-equipped means for operating upon the shape, means for progressing the shape relatively to the tool-equipped means, means for supplying a shape to the progressing means, and means for transferring a shape from the supplying means to the progressing means and supporting the shape while it is being progressed by the progressing means.

2. A machine for operating upon structural shapes including in combination tool-equipped means for operating upon the shape, means for progressing the shape relatively to the tool-equipped means, means for supplying a shape to the progressing means, and means for transferring a shape from the supplying means to the progressing means and supporting the shape by rolling contact while it is being progressed by the progressing means.

3. A machine for operating upon struchaving a radially movable stop, and connections for stopping the progressing means when said stops contact with each other.

28. A machine for operating upon structural shapes including in combination tool-equipped means, means for progressing the work relatively thereto, and distance determining means including a member having a stop which may be set to correspond to various distances, a second rotatable member having a radially movable stop, and connections for stopping the progressing means when said stops contact with each other.

29. A machine for operating upon structural shapes including in combination tool-equipped means, means for progressing the work relatively thereto, and distance determining means including a member having a stop which may be set radially thereof, a rotating member having a stop which is progressed radially thereof as it rotates, and connections from said member for controlling the movement of the progressing means.

30. A machine for operating upon structural shapes including in combination tool-equipped means, means for progressing the work relatively thereto, and distance determining means including a member having a stop which may be set radially thereof, a rotating member having a stop which is progressed radially thereof as it rotates, connections from said member for controlling the movement of the progressing means, and means for returning one of said members to an initial position.

31. A machine for operating upon structural shapes including in combination tool-equipped means, means for progressing the work relatively thereto, and distance determining means including a member having a stop which may be set radially thereof, a rotating member having a stop which is progressed radially thereof as it rotates, connections from said member for controlling the movement of the progressing means, means for returning one of said members to an initial position, and means controlled by the operator for permitting or preventing the action of said returning means.

32. A machine for operating upon structural shapes including in combination tool-equipped means, means for progressing the work relatively thereto, a movable member connected to the progressing means, driving means for the progressing means, and means which may be set to limit the movement of said movable member to correspond to a desired distance of travel of the work progressing means and connections for stopping the action of the driving mechanism at the limit of movement of said movable member.

33. A machine for operating upon structural shapes including in combination tool-equipped means, means for progressing the work relatively thereto, a rotatable member connected to said work progressing means to have a corresponding movement therewith, driving means for said work progressing means, a movable member for controlling the action of the driving means upon the work progressing means, means for causing said rotating member and said movable controlling member to move together, said movable controlling member also having independent movement to determine the amount of movement together of said two members, and means for determining said independent movement of said controlling member.

34. A machine for operating upon structural shapes including in combination a train of connected tool-equipped members, and a continuous means formed along said members for progressing the train, and means coacting with said last mentioned means to progress the train.

35. A machine for operating upon structural shapes including in combination a train of connected tool-equipped members, gear teeth formed on said members so as to be continuous along the entire train, and means acting on said teeth to progress the train.

36. A machine for operating upon structural shapes including in combination a train of tool-equipped members, a second train of tool-equipped members coöperating therewith, means for progressing them together, and means for moving one train in one direction to be in operative relation with the work, and means for moving the other train in a different direction to be in operative relation with the work.

37. A machine for operating upon structural shapes including in combination a train of tool-equipped members, a second train of tool-equipped members, a particular member in one train being designed for coöperating with a particular member of the other train in operating upon the work, means for moving the two trains together, and means for moving one member of one of the trains in one direction to bring it into operative relation with the work and means for moving its corresponding member in the other train in a different direction to bring it into operative relation with the work.

38. In a metal working machine in combination, means for positioning the work to be operated upon by a tool, a tool-equipped block consisting of two parts, said parts being independently movable into and out of operative relation with the positioned work and selective means coöperating therewith.

39. In a metal working machine in combination, means for positioning the work to be operated upon by a tool, a tool-equipped block consisting of two parts, constructed and arranged to receive a part of the work therebetween, and a tool-equipped block opposed to both of said parts and coöperating therewith in operating upon the positioned work and selective means coöperating therewith.

40. In a metal working machine in combination, means for positioning the work to be operated upon by a tool, a tool-equipped block consisting of two parts, and a tool equipped block opposed to both of said parts and coöperating therewith in operating upon the positioned work and selective means coöperating therewith.

41. A machine for operating upon structural shapes including in combination a train of tool-equipped blocks, two other trains of tool-equipped blocks, and means for bringing a block from each of said trains in coöperative relation with each other in operating upon the work, the blocks from two of said trains acting as a unit in opposition to the one block from the other train.

42. A machine for operating upon structural shapes including in combination a tool-equipped block, a second tool-equipped block consisting of two separate parts, and work progressing means for positioning the work between the two blocks and at the same time between the parts of said second block and selective means coöperating therewith.

43. A machine for operating upon structural shapes including in combination work positioning means three trains of blocks each being movable in a different direction from the others to be brought into coöperative relation with the others to operate upon the positioned work.

44. A machine for operating upon structural shapes including in combination tool-equipped means, means for progressing the work relatively thereto, means for supporting the work after it has passed the tool equipped means and while progressed by the work progressing means for carrying it from said work progressing means to the receiving means, and means for receiving the work.

45. A machine for operating upon structural shapes including in combination tool-equipped means, work progressing means, a conveyer for conveying away the finished work, and means for supporting the work while being progressed by the progressing means and for moving it to said conveying means when released by said progressing means.

46. A machine for operating upon structural shapes including in combination work supplying means, tool-equipped means, means for progressing the work relatively thereto, means for bringing the work into operative relation with said progressing means and for supporting it while being progressed thereby, and means for conveying away the finished work.

47. A machine for operating upon structural shapes including in combination work supplying means, tool-equipped means, means for progressing the work relatively thereto, and means mounted independently of said progressing means for bringing the work into operative relation with said progressing means and for supporting it while being progressed thereby.

48. A machine for operating upon structural shapes including in combination work supplying means, tool-equipped means, means for progressing the work relatively thereto, means for bringing the work into operative relation with said progressing means and for supporting it while being progressed thereby, means for conveying away the finished work, and means for transferring the work from said progressing means to said conveying means.

49. A machine for operating upon structural shapes including in combination work supplying means, tool-equipped means, means for progressing the work relatively thereto, means for bringing the work into operative relation with said progressing means and for supporting it while being progressed thereby, means for conveying away the finished work, and means for supporting the work while being progressed and for transferring it to said conveying means when released by said progressing means.

50. A machine for operating upon structural shapes including in combination tool-equipped means, means for progressing the work relatively thereto, work supplying means, a plurality of swinging arms for receiving the work from the supplying means and placing it in operative relation with the work progressing means and for supporting it during progression.

51. A machine for operating upon structural shapes including in combination tool-equipped means, means for progressing the work relatively thereto, work supplying means, a plurality of swinging arms for receiving the work from the supplying means and placing it in operative relation with the work progressing means and for alining it during progression.

52. A machine for operating upon structural shapes including in combination tool-equipped means, means for progressing the work relatively thereto, means for supporting the work in alinement after it has passed the tool-equipped means, said means being transversely movable to deliver the completed work to receiving means, and receiving means for receiving the work.

53. A machine for operating upon structural shapes including in combination tool-equipped means for operating upon the shape, means for progressing the shape relatively to the tool-equipped means to bring different parts of the shape successively into position to be operated upon by the tool-equipped means, means for supplying a shape to the progressing means, and means for transferring a shape from the supplying means to the progressing means and supporting the shape while it is being progressed by the progressing means.

54. A machine for operating upon structural shapes including in combination tool-equipped means for operating upon the shape, means for progressing the shape relatively to the tool equipped means, means for supplying a shape to said progressing means, means adapted to support a shape at a plurality of points along its length for transferring a shape from said supplying means to said progressing means and for supporting said shape at a plurality of points along its length as it is progressed by said progressing means relatively to said tool equipped means.

55. A machine for operating upon structural shapes including in combination tool-equipped means for operating upon the shape, means for progressing the shape relatively to the tool equipped means, means for supplying a shape to said progressing means, means adapted to support a shape at a plurality of points along its length by rolling contact as it is progressed by said progressing means relatively to said tool equipped means.

56. A machine for operating upon structural shapes including in combination tool-equipped means for operating upon the shape, means for progressing the shape lengthwise relatively to said tool equipped means, means for moving a shape transversely of its length into position relatively to said progressing means to be progressed thereby and for supporting said shape as it is progressed lengthwise by said progressing means relatively to said tool equipped means.

57. A machine for operating upon structural shapes including in combination tool-equipped means for operating upon the shape, means for progressing the shape lengthwise relatively to said tool equipped means, means for supporting at a plurality of points along its length and moving a shape transversely of its length into position relatively to said progressing means to be progressed thereby and for supporting said shape at a plurality of points along its length as it is progressed lengthwise by said progressing means relatively to said tool equipped means.

58. A machine for operating upon structural shapes including in combination tool-equipped means for operating upon the shape, means for progressing the shape lengthwise relatively to said tool equipped means, oscillating means for moving a shape transversely of its length into position relatively to said progressing means to be progressed thereby and for supporting said shape as it is progressed lengthwise by said progressing means relatively to said tool equipped means.

59. A machine for operating upon structural shapes including in combination tool-equipped means for operating upon the shape, means for progressing the shape lengthwise relatively to said tool equipped means, means not traveling with said progressing means for moving a shape transversely of its length into position relatively to said progressing means to be progressed thereby and for supporting said shape as it is progressed lengthwise by said progressing means relatively to said tool equipped means.

60. A machine for operating upon structural shapes including in combination tool-equipped means for operating upon the shape, means for progressing the shape lengthwise relatively to said tool equipped means, means not traveling with said progressing means for supporting at a plurality of points along its length and moving a shape transversely of its length into position relatively to said progressing means to be progressed thereby and for supporting said shape at a plurality of points along its length and as it is progressed lengthwise by said progressing means relatively to said tool equipped means.

61. A machine for operating upon structural shapes including in combination tool equipped means for operating upon the shape, means for progressing the shape lengthwise relatively to said tool equipped means, means for moving a shape transversely of its length into position relatively to said progressing means to be progressed thereby and for supporting said shape as it is progressed lengthwise by said progressing means relatively to said tool equipped means, and means for alining said shape transversely relatively to said tool equipped means.

62. A machine for operating upon structural shapes including in combination tool equipped means for operating upon the shape, means for progressing the shape lengthwise relatively to said tool equipped means, means for supporting at a plurality of points along its length and moving a shape transversely of its length into position relatively to said progressing means to be progressed thereby and for supporting said shape at a plurality of points along its length and as it is progressed lengthwise by said progressing means relatively to said tool equipped means, and a plurality of alining devices located between said various points of support for alining said shape transversely to said tool equipped means.

63. A machine for operating upon structural shapes including in combination tool equipped means for operating upon the shape, means for progressing the shape lengthwise relatively to said tool equipped means, means not traveling with said progressing means for supporting at a plurality of points along its length and moving a shape transversely of its length into position relatively to said progressing means to be progressed thereby and for supporting said shape at a plurality of points along its length as it is progressed lengthwise by said progressing means relatively to said tool equipped means and relatively to said progressing means.

64. A machine for operating upon structural shapes including in combination tool equipped means for operating upon the shape, means for progressing the shape lengthwise relatively to said tool equipped means, means for supporting at a plurality of points along its length and moving a shape transversely of its length into position relatively to said progressing means to be progressed thereby, and for supporting said shape at a plurality of points along its length as it is progressed lengthwise by said progressing means relatively to said tool equipped means, and a plurality of alining devices located between said various points of support for alining said shape transversely relatively to said tool equipped means, and relatively to said progressing means.

65. A machine for operating upon structural shapes including in combination tool equipped means for operating upon the shape, means for progressing the shape relative to the tool equipped means, means for supplying a shape to said progressing means, means adapted to support a shape at a plurality of points along its length for transferring a shape from said supplying means to said progressing means and for supporting said shape at a plurality of points along its length by rolling contact as it is progressed by said progressing means relatively to said tool equipped means, and means for alining said shape transversely relatively to said tool equipped means.

66. A machine for operating upon structural shapes including in combination tool equipped means for operating upon the shape, means for progressing the shape lengthwise relatively to said tool equipped means, means for supporting at a plurality of points along its length and moving a shape transversely of its length into position relatively to said progressing means to be progressed thereby and for supporting said shape by rolling contact at a plurality of points along its length as it is progressed lengthwise by said progressing means relatively to said tool equipped means.

67. A machine for operating upon structural shapes including in combination tool equipped means for operating upon the shape, means for progressing the shape lengthwise relatively to said tool equipped means, means for supporting at a plurality of points along its length and moving a shape transversely of its length into position relatively to said progressing means to be progressed thereby and for supporting said shape by rolling contact at a plurality of points along its length as it is progressed lengthwise by said progressing means relatively to said tool equipped means, and means for alining said shape transversely relatively to said tool equipped means.

68. A machine for operating upon structural shapes including in combination tool equipped means for operating upon the shape, means for progressing the shape lengthwise relatively to said tool equipped means, means for supporting at a plurality of points along its length and moving a shape transversely of its length into position relatively to said progressing means to be progressed thereby and for supporting said shape by rolling contact at a plurality of points along its length as it is progressed lengthwise by said progressing means, relatively to said tool equipped means, and means for alining said shape transversely relatively to said tool equipped means and relatively to said progressing means.

69. A machine for operating upon structural shapes including in combination tool equipped means for operating upon the shape, means for progressing the shape longitudinally of itself and relative to the tool equipped means, means for supporting a shape at a plurality of points along its length and for moving the shape transversely of its length from a position outside the path of the progressing means and for supporting said shape at a plurality of points along its length while being progressed by said progressing means.

70. A machine for operating upon structural shapes including in combination tool equipped means for operating upon the shape, means for progressing the shape longitudinally of itself and relative to the tool equipped means, means for supporting a shape at a plurality of points along its length and for moving the shape transversely of its length from a position outside the path of the progressing means and for supporting said shape at a plurality of points along its length while being progressed by said progressing means, settable distance determining devices and means for stopping said progressing means in accordance with the setting of said devices.

71. A machine for operating upon structural shapes including in combination tool equipped means for operating upon the shape, means for progressing the shape longitudinally of itself and relative to the tool equipped means, means for supporting a shape at a plurality of points along its length and for moving the shape transversely of its length from a position outside the path of the progressing means and for supporting said shape at a plurality of points, along its length by rolling contact while being progressed by said progressing means.

72. A machine for operating upon structural shapes including in combination tool equipped means for operating upon the shape, means for progressing the shape longitudinally of itself and relative to the tool equipped means, means for supporting a shape at a plurality of points along its length and for moving the shape transversely of its length from a position outside the path of the progressing means and for supporting said shape at a plurality of points along its length by rolling contact while being progressed by said progressing means, settable distance determining devices and means for stopping said progressing means in accordance with the setting of said devices.

73. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means for supporting the shape at a plurality of points and moving it transversely of its length from said supplying means into operative relation with said progressing means and for supporting it at a plurality of points along its length while being progressed by said progressing means.

74. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means for supporting the shape at a plurality of points and moving its transversely of its length from said supplying means into operative relation with said progressing means and for supporting it at a plurality of points along its length by rolling contact while being progressed by said progressing means.

75. A machine for operating upon structural shapes including in combination tool equipped means for operating upon the shape, means for progressing the shape longitudinally of itself and relative to the tool equipped means, means located at one side of said tool equipped means for supporting a shape at a plurality of points along its length and for moving the shape transversely of its length from a position outside the path of the progressing means and for supporting said shape at a plurality of points along its length while being progressed by said progressing means, and means located at the other side of said tool equipped means for supporting said shape at a plurality of points along its length and for removing it from operative relation with said progressing means.

76. A machine for operating upon structural shapes including in combination tool equipped means for operating upon the shape, means for progressing the shape longitudinally of itself and relative to the tool equipped means, means located at one side of said tool equipped means for supporting a shape at a plurality of points along its length and for moving the shape transversely of its length from a position outside the path of the progressing means and for supporting said shape at a plurality of points along its length while being progressed by said progressing means, and means located at the other side of said tool equipped means for supporting said shape at a plurality of points along its length and for removing it transversely of its length from operative relation with said progressing means.

77. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means located at one side of said tool equipped means for supporting the shape at a plurality of points and moving it transversely of its length from said supplying means into operative relation with said progressing means and for supporting it at a plurality of points along its length while being progressed by said progressing means, and means located at the other side of said tool equipped means for supporting said shape at a plurality of points along its length and for removing it from operative relation with said progressing means.

78. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means located at one side of said tool equipped means for supporting the shape at a plurality of points and moving it transversely of its length from said supplying means into operative relation with said progressing means and for supporting it at a plurality of points along its length while being progressed by said progressing means, and means located at the other side of said tool equipped means for supporting said shape at a plurality of points along its length and for removing it transversely of its length from operative relation with said progressing means.

79. A machine for operating upon structural shapes including in combination tool equipped means for operating upon the shape, means for progressing the shape longitudinally of itself and relative to the tool equipped means, swinging means for supporting a shape at a plurality of points along its length and for moving the shape transversely of its length from a position outside the path of the progressing means and for supporting said shape at a plurality of points along its length while being progressed by said progressing means.

80. A machine for operating upon structural shapes including in combination tool equipped means for operating upon the shape, means for progressing the shape longitudinally of itself and relative to the tool equipped means, swinging means located at one side of said tool equipped means for supporting a shape at a plurality of points along its length and for moving the shape transversely of its length from a position outside the path of the progressing means and for supporting said shape at a plurality of points along its length while being progressed by said progressing means, and swinging means located at the other side of said tool equipped means for supporting said shape at a plurality of points along its length and for removing it from operative relation with said progressing means.

81. A machine for operating upon structural shapes including in combination tool equipped means for operating upon the shape, means for progressing the shape longitudinally of itself and relative to the tool equipped means, swinging means for supplying a shape at the side of and lengthwise of the path of travel of said progressing means, means for supporting the shape at a plurality of points and moving it transversely of its length from said supplying means into operative relation with said progressing means and for supporting it at a plurality of points along its length while being progressed by said progressing means, and means located at the other side of said tool equipped means for supporting said shape at a plurality of points along its length and for removing it from operative relation with said progressing means.

82. A machine for operating upon structural shapes including in combination tool equipped means for operating upon the shape, means for progressing the shape longitudinally of itself and relative to the tool equipped means, swinging means for supplying a shape at the side of and lengthwise of the path of travel of said progressing means, for supporting the shape at a plurality of points and moving it transversely of its length from said supplying means into operative relation with said progressing means and for supporting it at a plurality of points along its length while being progressed by said progressing means, and means located at the other side of said tool equipped means for supporting said shape at a plurality of points along its length and for removing it from operative relation with said progressing means.

83. A machine for operating upon structural shapes including in combination tool equipped means for operating upon the shape, means for progressing the shape longitudinally of itself and relative to the tool equipped means, means swinging about an axis in substantial vertical alinement with said progressing means for supporting a shape at a plurality of points along its length and for moving the shape transversely of its length from a position outside the path of the progressing means and for supporting said shape at a plurality of points along its length while being progressed by said progressing means.

84. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means swinging about an axis in substantially vertical alinement with said progressing means for supporting the shape at a plurality of points and moving it transversely of its length from said supplying means into operative relation with said progressing means and for supporting it at a plurality of points along its length while being progressed by said progressing means.

85. A machine for operating upon structural shapes including in combination tool equipped means for operating upon the shape, means for progressing the shape longitudinally of itself and relative to the tool equipped means, means for supplying a shape at the side of and lengthwise of the path of travel of said progressing means, means swinging about an axis in substantially vertical alinement with said progressing means for supporting the shape at a plurality of points and moving it transversely of its length from said supplying means into operative relation with said progressing means and for supporting it at a plurality of points along its length by rolling contact while being progressed by said progressing means.

86. A machine for operating upon structural shapes including in combination tool equipped means for operating upon the shape, means for horizontally progressing the shape longitudinally of itself and relative to the tool equipped means, means for supporting a shape at a plurality of points along its length and for moving the shape transversely of its length from a position outside the path of the progressing means and for supporting said shape at a plurality of points along its length while being progressed by said progressing means.

87. A machine for operating upon structural shapes including in combination tool equipped means for operating upon the shape, means for horizontally progressing the shape longitudinally of itself and relative to the tool equipped means, means swinging about an axis in substantial vertical alinement with said progressing means for supporting a shape at a plurality of points along its length and for moving the shape transversely of its length from a position outside the path of the progressing means and for supporting said shape at a plurality of points along its length while being progressed by the progressing means.

88. A machine for operating upon structural shapes including in combination tool equipped means for operating upon the shape, means for horizontally progressing the shape longitudinally of itself and relative to the tool equipped means, means for supplying a shape at the side of and lengthwise of the path of travel of said progressing means, means for supporting the shape at a plurality of points and moving it transversely of its length from said supplying means into operative relation with said progressing means and for supporting it at a plurality of points along its length while being progressed by said progressing means.

89. A machine for operating upon structural shapes including in combination tool equipped means for operating upon the shape, means for horizontally progressing the shape longitudinally of itself and relative to the tool equipped means, means for supplying a shape at the side of and lengthwise of the path of travel of said progressing means, means swinging about an axis in substantially vertical alinement with said progressing means for supporting the shape at a plurality of points and moving it transversely of its length from said supplying means into operative relation with said progressing means and for supporting it at a plurality of points along its length while being progressed by said progressing means.

90. A machine for operating upon structural shapes including in combination tool equipped means for operating upon the shape, means for horizontally progressing the shape longitudinally of itself and relative to the tool equipped means, means located at one side of said tool equipped means for supporting a shape at a plurality of points along its length and for moving the shape transversely of its length from a position outside the path of the progressing means and for supporting said shape at a plurality of points along its length while being progressed by said progressing means, and means located at the other side of said tool equipped means for supporting said shape at a plurality of points along its length and for removing it from operative relation with said progressing means.

91. A machine for operating upon structural shapes including in combination tool-equipped means, a drag on at one side thereof, a drag off at the other side thereof, a series of swinging work supporting arms at one side of the tool-equipped means, another series of work supporting arms at the other side of said tool-equipped means, and means for progressing a shape past said tool equipped means.

92. A machine for operating upon structural shapes including in combination tool-equipped means, a drag on at one side thereof, a drag off at the other side thereof, a series of swinging work supporting arms at one side of the tool-equipped means, another series of work supporting arms at the other side of said tool-equipped means, means for progressing a shape past said tool equipped means, and means for stopping the progressing means with the shape in a predetermined position with respect to said tool-equipped means.

93. A machine for operating upon structural shapes including in combination tool-equipped means, a drag on at one side thereof, a drag off at the other side thereof, a series of swinging work supporting arms at one side of the tool-equipped means passing successively into operative relation with the drag on and the progresssing means, another series of work supporting arms at the other side of said tool-equipped means passing successively into operative relation with the drag off and the progressing means, and means for progressing a shape past said tool-equipped means.

94. A machine for operating upon structural shapes including in combination tool-equipped means, a drag on at one side thereof, a drag off at the other side thereof, a series of swinging work supporting arms at one side of the tool-equipped means passing successively into operative relation with the drag on and the progressing means, another series of work supporting arms at the other side of said tool equipped means, means for progressing a shape past said tool-equipped means, and means for stopping the progressing means with the shape in a predetermined position with respect to said tool equipped means.

95. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool equipped means, and means movable to receive a shape outside the path of travel of said progressing means and move it into position to be engaged by said progressing means and for supporting it during its progression by said progressing means.

96. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool equipped means, and means movable to receive a shape at one side of the path of travel of said progressing means and moving it transversely into position to be engaged by said progressing means and for supporting it during its progression by said progressing means.

97. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool-equipped means, and means movable to receive a shape at one side of the path of travel of said progressing means and moving it transversely into position to be engaged by said progressing means and for supporting it by rolling contact during its progression by said progressing means.

98. A machine for operating upon structural shapes including in combination tool-equipped means, means for progressing a shape lengthwise past said tool equipped means, said progressing means comprising members engaging the ends of the shape and other members holding said members in fixed relation with each other, said progressing means traveling in a horizontal path, means for stopping said progressing means with said shape in predetermined relation with said tool-equipped means, and means movable to receive a shape outside the path of travel of said progressing means and move it into position to be engaged by said progressing means and for supporting it during its progression by said progressing means.

99. A machine for operating upon structural shapes including in combination tool-equipped means, means for progressing a shape lengthwise past said tool-equipped means, said progressing means comprising members engaging the ends of the shape and other members holding said members in fixed relation with each other, said progressing means traveling in a horizontal path, means for stopping said progressing means with said shape in predetermined relation with said tool-equipped means, and means movable to receive a shape outside the path of travel of said progressing means and move it into position to be engaged by said progressing means and for supporting it by rolling contact during its progression by said progressing means.

100. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool equipped means, means for causing said stopping means to repeat its action after again traveling a distance equal to said predetermined distance, and means movable to receive a shape outside the path of travel of said progressing means and move it into position to be engaged by said progressing means and for supporting it during its progression by said progressing means.

101. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool-equipped means, means movable to receive a shape outside the path of travel of said progressing means and move it into position to be engaged by said progressing means and for supporting it during its progression by said progressing means, means located on the opposite side of said tool-equipped means from said supplying means for engaging said shape while still in operative relation with the progressing means and removing it from operative relation with said progressive means.

102. A machine for operating upon structural shapes including in combination tool-equipped means, means for progressing a shape lengthwise past said tool-equipped means, said progressing means comprising members engaging the ends of the shape and other members holding said members in fixed relation with each other, means for stopping said progressing means with said shape in predetermined relation with said tool-equipped means, and means movable to receive a shape at one side of the path of travel of said progressing means and moving it transversely into position to be engaged by said progressing means and for supporting it during its progression by said progressing means, means located on the opposite side of said tool-equipped means from said supplying means for engaging said shape while still in operative relation with the progressing means, and removing it transversely from operative relation with said progressive means.

103. A machine for operating upon structural shapes including in combination a substantially horizontal path along which the shape is progressed, tool equipped means located along said path intermediate its ends, means for progressing and arresting the shape relatively to the tool equipped means to be operated upon thereby, and means traveling independently of but proportioned to the progressing means and settable by the operator to a desired distance for automatically stopping the shape relatively to the tool equipped means after it has traveled said set distance.

104. A machine for operating upon structural shapes including in combination a substantially horizontal path along which the shape is progressed, tool equipped means located along said path intermediate its ends, means for progressing and arresting the shape relatively to the tool equipped means to be operated upon thereby, and means settable by the operator to a desired distance and comprising a rotating member having a travel proportional to that of the progressed shape for automatically stopping the shape relatively to the tool equipped means after it has traveled said set distance.

105. A machine for operating upon structural shapes including in combination a path along which the shape is progressed, tool equipped means located along said path intermediate its ends, means for progressing and arresting the shape relatively to the tool equipped means to be operated upon thereby, and means traveling independently of but proportioned to the progressing means and settable by the operator to a desired distance for automatically stopping the shape relatively to the tool equipped means after it has traveled said set distance.

106. A machine for operating upon structural shapes including in combination a path along which the shape is progressed, tool equipped means located along said path intermediate its ends, means for progressing and arresting the shape relatively to the tool equipped means to be operated upon thereby, and means settable by the operator to a desired distance and comprising a rotating member having a travel proportional to that of the progressed shape for automatically stopping the shape relatively to the tool equipped means after it has traveled said set distance.

107. A machine for operating upon structural shapes including in combination a substantially horizontal path along which the shape is progressed, tool equipped means located along said path intermediate its ends, means for progressing and arresting the shape relatively to the tool equipped means to be operated upon thereby, a member not traveling with but having a travel proportionate to that of the progressed shape, means settable by the operator in the path of said traveling member, and means controlled by said settable member and traveling member for arresting the shape relatively to the tool equipped means in accordance with the setting of said settable member.

108. A machine for operating upon structural shapes including in combination a substantially horizontal path along which the shape is progressed, tool equipped means located along said path intermediate its ends, means for progressing and arresting the shape relatively to the tool equipped means, to be operated upon thereby, a member having rotary travel proportionate to that of the progressed shape, means settable by the operator in the path of said traveling member, and means controlled by said settable member and traveling member for arresting the shape relatively to the tool equipped means in accordance with the setting of said settable member.

109. A machine for operating upon structural shapes including in combination a path along which the shape is progressed, tool equipped means located along said path intermediate its ends, means for progressing and arresting the shape relatively to the tool equipped means to be operated upon thereby, a member not traveling with but having a travel proportionate to that of the progressed shape, means settable by the operator in the path of said traveling member, and means controlled by said settable member and traveling member for arresting the shape relatively to the tool equipped means in accordance with the setting of said settable member.

110. A machine for operating upon structural shapes including in combination a path along which the shape is progressed, tool equipped means located along said path intermediate its ends, means for progressing and arresting the shape relatively to the tool equipped means to be operated upon thereby, a member having rotary travel proportionate to that of the progressed shape, means settable by the operator in the path of said traveling member, and means controlled by said settable member and traveling member for arresting the shape relatively to the tool equipped means in accordance with the setting of said settable member.

111. A machine for operating upon structural shapes including in combination a head traveling along a pathway, tool equipped means for operating upon a shape located on said pathway, means for progressing a shape along said pathway and in fixed relation to said head, a distance determining member traveling in fixed relation with the travel of said head along said pathway, settable distance determining devices coöperating with said traveling member and means controlled by said traveling member and settable devices for positioning said head relatively to said tool equipped means in accordance with the setting of said settable devices.

112. A machine for operating upon structural shapes including in combination a head traveling along a pathway, tool equipped means for operating upon a shape located on said pathway, means for progressing a shape along said pathway and in fixed relation to said head, a distance determining member rotating in fixed relation with the travel of said head along said pathway, settable distance determining devices coöperating with said traveling member and means controlled by said traveling member and settable devices for positioning said head relatively to said tool equipped means in accordance with the setting of said settable devices.

113. A machine for operating upon structural shapes including in combination a head traveling along a substantially horizontal pathway, tool equipped means for operating upon a shape located on said pathway, means for progressing a shape along said pathway and in fixed relation to said head, a distance determining member traveling in fixed relation with the travel of said head along said pathway, settable distance determining devices coöperating with said traveling member and means controlled by said traveling member and settable devices for positioning said head relatively to said tool equipped means in accordance with the setting of said settable devices.

114. A machine for operating upon structural shapes including in combination a head traveling along a substantial horizontal pathway, tool equipped means for operating upon a shape located on said pathway, means for progressing a shape along said pathway and in fixed relation to said head, a distance determining member rotating in fixed relation with the travel of said head along said pathway, settable distance determining devices coöperating with said traveling member and means controlled by said traveling member and settable devices for positioning said head relatively to said tool equipped means in accordance with the setting of said settable devices.

In testimony whereof, I have signed my name to this specification, in the presence of two subscribing witnesses.

THEODORE P. PAYNE.

Witnesses:
R. W. PAYNE,
R. MEUK.